(12) United States Patent
Altman et al.

(10) Patent No.: US 9,195,325 B2
(45) Date of Patent: Nov. 24, 2015

(54) METHOD AND SYSTEM FOR OBTAINING POSITIONING DATA

(71) Applicant: QUALCOMM Incorporated, San Diego, CA (US)

(72) Inventors: Nathan Altman, Tel Aviv (IL); Oded Eliashiv, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/953,703

(22) Filed: Jul. 29, 2013

(65) Prior Publication Data

US 2013/0314381 A1 Nov. 28, 2013

Related U.S. Application Data

(63) Continuation of application No. 10/510,228, filed as application No. PCT/IL2003/000309 on Oct. 13, 2004, now Pat. No. 8,546,706.

(60) Provisional application No. 60/372,197, filed on Apr. 15, 2002, provisional application No. 60/425,304, filed on Nov. 12, 2002.

(51) Int. Cl.
*G06F 3/033* (2013.01)
*G06F 3/041* (2006.01)
(Continued)

(52) U.S. Cl.
CPC ............ *G06F 3/03545* (2013.01); *G06F 3/011* (2013.01); *G06F 3/014* (2013.01); *G06F 3/0304* (2013.01); *G06F 3/0346* (2013.01); *G06F 3/041* (2013.01); *G06F 3/043* (2013.01); *G06F 3/046* (2013.01); *G06K 9/224* (2013.01)

(58) Field of Classification Search
CPC ......... G06F 3/033; G06F 3/041; G06K 11/06; G09G 3/22; G09G 3/28; G08C 21/00
USPC ................. 345/173, 175, 177, 179, 182–183; 178/18.01–19.02, 47
See application file for complete search history.

(56) References Cited

U.S. PATENT DOCUMENTS 2,567,407 A 9/1951 Slaymaker
4,183,011 A 1/1980 Massa
(Continued)

FOREIGN PATENT DOCUMENTS

CN 2612094 Y 4/2004
DE 19701344 A1 7/1997
(Continued)

OTHER PUBLICATIONS

Attisano, et al., "Signal Transduction by the TGF beta Superfamily", Science, 2002, vol. 296 (5573), pp. 1646-1647.
(Continued)

*Primary Examiner* — Kenneth Bukowski
(74) *Attorney, Agent, or Firm* — Haynes and Boone, LLP

(57) ABSTRACT

A position detection system for use in association with computing applications, the system comprising: a positional element for attaining a position and comprising a first emitter for emitting a substantially continuous ultrasonic waveform decodable to fix said position, and a detector arrangement for detecting said waveform in a manner permitting fixing of said position and outputting said waveform for computation, in a manner retentive of said position fixing ability.

29 Claims, 17 Drawing Sheets

(51) Int. Cl.

| | | |
|---|---|---|
| *G06K 11/06* | (2006.01) | |
| *G08C 21/00* | (2006.01) | |
| *G09G 3/28* | (2013.01) | |
| *G09G 3/22* | (2006.01) | |
| *G06F 3/0354* | (2013.01) | |
| *G06F 3/01* | (2006.01) | |
| *G06F 3/03* | (2006.01) | |
| *G06F 3/0346* | (2013.01) | |
| *G06F 3/043* | (2006.01) | |
| *G06F 3/046* | (2006.01) | |
| *G06K 9/22* | (2006.01) | |

(56) References Cited

U.S. PATENT DOCUMENTS

| | | | |
|---|---|---|---|
| 4,211,489 | A | 7/1980 | Bosenberg et al. |
| 4,271,490 | A | 6/1981 | Minohara et al. |
| 4,297,607 | A | 10/1981 | Lynnworth et al. |
| 4,433,399 | A | 2/1984 | Massa |
| 4,501,186 | A | 2/1985 | Ikuma |
| 4,554,834 | A | 11/1985 | Prinz et al. |
| 4,576,047 | A | 3/1986 | Lauer et al. |
| 4,577,506 | A | 3/1986 | Poole et al. |
| 4,630,072 | A | 12/1986 | Scardovi et al. |
| 4,641,291 | A | 2/1987 | Simmons, Sr. et al. |
| 4,672,592 | A | 6/1987 | Skinner |
| 4,814,552 | A * | 3/1989 | Stefik et al. ............ 178/19.02 |
| 4,855,961 | A | 8/1989 | Jaffe et al. |
| 4,991,148 | A | 2/1991 | Gilchrist |
| 5,062,089 | A | 10/1991 | Willard et al. |
| 5,138,159 | A | 8/1992 | Takase et al. |
| 5,142,506 | A | 8/1992 | Edwards |
| 5,245,863 | A | 9/1993 | Kajimura et al. |
| 5,339,259 | A * | 8/1994 | Puma et al. ............... 702/153 |
| 5,372,138 | A | 12/1994 | Crowley et al. |
| 5,391,197 | A | 2/1995 | Burdette et al. |
| 5,394,741 | A | 3/1995 | Kajimura et al. |
| 5,402,150 | A | 3/1995 | Stiles |
| 5,421,338 | A | 6/1995 | Crowley et al. |
| 5,432,346 | A | 7/1995 | Nose et al. |
| 5,465,412 | A | 11/1995 | Mueller et al. |
| 5,511,043 | A | 4/1996 | Lindberg |
| 5,515,853 | A | 5/1996 | Smith et al. |
| 5,517,579 | A | 5/1996 | Baron et al. |
| 5,519,686 | A | 5/1996 | Yanagisawa et al. |
| 5,524,630 | A | 6/1996 | Crowley |
| 5,530,683 | A | 6/1996 | Lindberg |
| 5,550,791 | A | 8/1996 | Peloquin |
| 5,553,846 | A * | 9/1996 | Frye et al. .................. 473/455 |
| 5,557,301 | A | 9/1996 | D'Aviau de Piolant |
| 5,581,269 | A * | 12/1996 | Butcher ......................... 345/1.1 |
| 5,588,432 | A | 12/1996 | Crowley |
| 5,682,445 | A | 10/1997 | Smith |
| 5,691,580 | A | 11/1997 | Shelby |
| 5,702,629 | A | 12/1997 | Cui et al. |
| 5,715,825 | A | 2/1998 | Crowley |
| 5,721,721 | A | 2/1998 | Yanagisawa et al. |
| 5,750,941 | A | 5/1998 | Ishikawa et al. |
| 5,781,661 | A | 7/1998 | Hiraiwa et al. |
| 5,840,031 | A | 11/1998 | Crowley |
| 5,854,450 | A * | 12/1998 | Kent ........................... 178/18.04 |
| 5,866,856 | A | 2/1999 | Holtzman |
| 5,867,146 | A | 2/1999 | Kim et al. |
| 5,913,629 | A | 6/1999 | Hazzard |
| 5,977,958 | A | 11/1999 | Baron et al. |
| 6,002,387 | A * | 12/1999 | Ronkka et al. .............. 345/157 |
| 6,004,269 | A | 12/1999 | Crowley et al. |
| 6,111,565 | A | 8/2000 | Chery et al. |
| 6,137,621 | A | 10/2000 | Wu |
| 6,147,681 | A | 11/2000 | Chery et al. |
| 6,151,014 | A | 11/2000 | Zloter et al. |
| 6,169,281 | B1 | 1/2001 | Chen et al. |
| 6,211,863 | B1 | 4/2001 | Chery et al. |
| 6,232,962 | B1 | 5/2001 | Davis et al. |
| 6,252,656 | B1 | 6/2001 | Wu et al. |
| 6,265,676 | B1 | 7/2001 | Zloter et al. |
| 6,282,340 | B1 | 8/2001 | Nasu et al. |
| 6,292,177 | B1 | 9/2001 | Holtzman et al. |
| 6,292,180 | B1 | 9/2001 | Lee |
| 6,300,580 | B1 | 10/2001 | Shenholz et al. |
| 6,307,956 | B1 | 10/2001 | Black |
| 6,324,292 | B1 | 11/2001 | Mitsuhashi et al. |
| 6,367,335 | B1 | 4/2002 | Hicks et al. |
| 6,392,230 | B1 | 5/2002 | Aita |
| 6,392,330 | B1 | 5/2002 | Zloter et al. |
| 6,424,340 | B1 | 7/2002 | Holtzman et al. |
| 6,430,342 | B1 | 8/2002 | Kim et al. |
| 6,485,413 | B1 | 11/2002 | Boppart et al. |
| 6,504,289 | B2 | 1/2003 | Toda et al. |
| 6,577,299 | B1 * | 6/2003 | Schiller et al. ................ 345/179 |
| 6,594,369 | B1 | 7/2003 | Une |
| 6,607,136 | B1 * | 8/2003 | Atsmon et al. ................ 235/492 |
| 6,681,635 | B1 | 1/2004 | Van Schaik |
| 6,724,371 | B1 | 4/2004 | Shenholtz et al. |
| 6,738,408 | B2 | 5/2004 | Abedin |
| 6,745,632 | B1 | 6/2004 | Dryer et al. |
| 6,771,006 | B2 | 8/2004 | Zioter et al. |
| 6,778,735 | B2 | 8/2004 | Miller et al. |
| 6,798,403 | B2 * | 9/2004 | Kitada et al. .................. 345/173 |
| 6,816,266 | B2 | 11/2004 | Varshneya et al. |
| 6,822,641 | B2 | 11/2004 | Shenholz et al. |
| 6,823,105 | B2 | 11/2004 | Zloter et al. |
| 6,831,781 | B2 | 12/2004 | Tearney et al. |
| 6,841,742 | B2 | 1/2005 | Shenholz et al. |
| 6,873,415 | B2 | 3/2005 | Amonette et al. |
| 7,113,173 | B1 | 9/2006 | Bi et al. |
| 7,166,910 | B2 | 1/2007 | Minervini |
| 7,336,262 | B2 | 2/2008 | Tsuji |
| 8,248,389 | B2 | 8/2012 | Raif et al. |
| 2001/0016856 | A1 | 8/2001 | Tsuji et al. |
| 2001/0020936 | A1 * | 9/2001 | Tsuji ............................. 345/177 |
| 2002/0031243 | A1 | 3/2002 | Schiller et al. |
| 2002/0040817 | A1 * | 4/2002 | LeKuch et al. ............ 178/18.09 |
| 2002/0060665 | A1 | 5/2002 | Sekiguchi et al. |
| 2002/0140673 | A1 | 10/2002 | Tanaka |
| 2002/0176577 | A1 | 11/2002 | Xu |
| 2003/0029707 | A1 | 2/2003 | Gillman et al. |
| 2003/0055655 | A1 * | 3/2003 | Suominen ..................... 704/276 |
| 2003/0095708 | A1 | 5/2003 | Pittel |
| 2003/0112623 | A1 | 6/2003 | Yu et al. |
| 2003/0142065 | A1 | 7/2003 | Pahlavan |
| 2003/0151596 | A1 | 8/2003 | Moyne et al. |
| 2003/0221876 | A1 | 12/2003 | Doczy et al. |
| 2004/0000838 | A1 | 1/2004 | Toda |
| 2004/0032399 | A1 | 2/2004 | Sekiguchi et al. |
| 2004/0169439 | A1 | 9/2004 | Toda |
| 2004/0201569 | A1 | 10/2004 | Fujiwara et al. |
| 2005/0030297 | A1 | 2/2005 | Burstrom et al. |
| 2005/0077102 | A1 | 4/2005 | Banter et al. |
| 2007/0189568 | A1 | 8/2007 | Wilk et al. |
| 2008/0084789 | A1 | 4/2008 | Altman |
| 2010/0142325 | A1 | 6/2010 | Altman et al. |
| 2012/0086675 | A1 | 4/2012 | Raif et al. |

FOREIGN PATENT DOCUMENTS

| | | |
|---|---|---|
| EP | 0312481 A2 | 4/1989 |
| EP | 0666543 A2 | 8/1995 |
| EP | 1450296 A2 | 8/2004 |
| EP | 1755360 A1 | 2/2007 |
| GB | 2043899 A | 10/1980 |
| GB | 2121174 A | 12/1983 |
| JP | S53117466 A | 10/1978 |
| JP | 57108769 A | 7/1982 |
| JP | 61176331 A | 8/1986 |
| JP | 63106585 A | 5/1988 |
| JP | S6446672 A | 2/1989 |
| JP | H06149468 A | 5/1994 |
| JP | H06338915 A | 12/1994 |
| JP | H07160880 A | 6/1995 |
| JP | 7255764 A | 10/1995 |
| JP | H07287632 A | 10/1995 |
| JP | 8129446 A | 5/1996 |

(56) References Cited

FOREIGN PATENT DOCUMENTS

| | | |
|---|---|---|
| JP | H08321670 A | 12/1996 |
| JP | 9243343 A | 9/1997 |
| JP | 9305306 A | 11/1997 |
| JP | H11237950 A | 8/1999 |
| JP | 2000125387 A | 4/2000 |
| JP | 2000215312 A | 8/2000 |
| JP | 2000231633 A | 8/2000 |
| JP | 2001042888 A | 2/2001 |
| JP | 2001054196 A | 2/2001 |
| JP | 2001236451 A | 8/2001 |
| JP | 2001245394 A | 9/2001 |
| JP | 2001518209 A | 10/2001 |
| JP | 2002042137 A | 2/2002 |
| JP | 2002062978 A | 2/2002 |
| JP | 2002091472 A | 3/2002 |
| JP | 2002509317 A | 3/2002 |
| JP | 2002132436 A | 5/2002 |
| JP | 2002140709 A | 5/2002 |
| JP | 2002297306 A | 10/2002 |
| JP | 2003051014 A | 2/2003 |
| JP | 2004070887 A | 3/2004 |
| JP | 2004164505 A | 6/2004 |
| JP | 2005174190 A | 6/2005 |
| JP | 2005518657 A | 6/2005 |
| JP | 2005183437 A | 7/2005 |
| JP | 2005522708 A | 7/2005 |
| JP | 2007060661 A | 3/2007 |
| JP | 2007104582 A | 4/2007 |
| KR | 970060988 A | 8/1997 |
| KR | 20040006769 A | 1/2004 |
| KR | 20040009625 A | 1/2004 |
| TW | 394833 B | 6/2000 |
| TW | I235010 B | 6/2005 |
| WO | 9733145 A1 | 9/1997 |
| WO | 0013039 A2 | 3/2000 |
| WO | 0021020 A2 | 4/2000 |
| WO | 0021203 A1 | 4/2000 |
| WO | 0135329 A1 | 5/2001 |
| WO | 0201466 A2 | 1/2002 |
| WO | 03001358 A1 | 1/2003 |
| WO | 03027643 A1 | 4/2003 |
| WO | 03069547 A1 | 8/2003 |
| WO | 2004010592 A2 | 1/2004 |
| WO | 2005072262 A2 | 8/2005 |
| WO | 2005111653 A2 | 11/2005 |
| WO | 2006100682 A2 | 9/2006 |
| WO | 2007004119 A2 | 1/2007 |
| WO | 2008111011 A2 | 9/2008 |

OTHER PUBLICATIONS

Cai, et al., "A Study on Packaging of PZT MEMS Microphone", Electronics Components and Technology Conference, Lake Buena Vista, FL, USA, XP002488699, pp. 1077-1080, Jun. 3, 2005. Retrieved From the Internet: URL:http://ieeexplore.ieee.org/ie15/9844/31024/01441405.pdf>.

International Search Report Dated Sep. 22, 2004 From the International Searching Authority Re. Application No. PCT/IL03/00309.

Junge, et al., "Simulation of Capacitive Micromachined Ultrasonic Transducers (cMUT) for Low Frequencies and Silicon Condenser Microphones Using an Analytical Model", Proceedings of the IEEE Ultrasonic Symposium, Honolulu, Hawaii, Oct. 5 2003, XP010701172, vol. 1, 485-488 & 487.

Neurmann Jr., et al., "CMOS-MEMS Membrane for Audio-Frequency Acoustic Actuation", Sensors and Actuators A, XP004377889, Jan. 1, 2002, vol. 95 (2-3), pp. 175-182.

Nicolet, et al., "Desulfovibrio Desulfuricans Iron Hydrogenase: The Structure Shows Unusual Coordination to an Active Site Fe Binuclear Center", Structure, 1999, vol. 7, pp. 13-23.

Nonaka, et al., "Ultrasonic Position Measurement and Its Applications to Human Interface", Instrumentation and Measurement Technology Conference, IMTC/94, Conference Proceedings, 10th Anniversary, Advanced Technologies in I & M, IEEE Hamatsu, Japan, IEEE New York, USA, XP010121966, 1994, pp. 753-756.

Peters, et al., "X-Ray Crystal Structure of the Fe-Only Hydrogenase (Cpl) From Clostridium pasteurianum to 1.8 Angstrom Resolution", Science, 1998, vol. 282, pp. 1853-1858.

\* cited by examiner

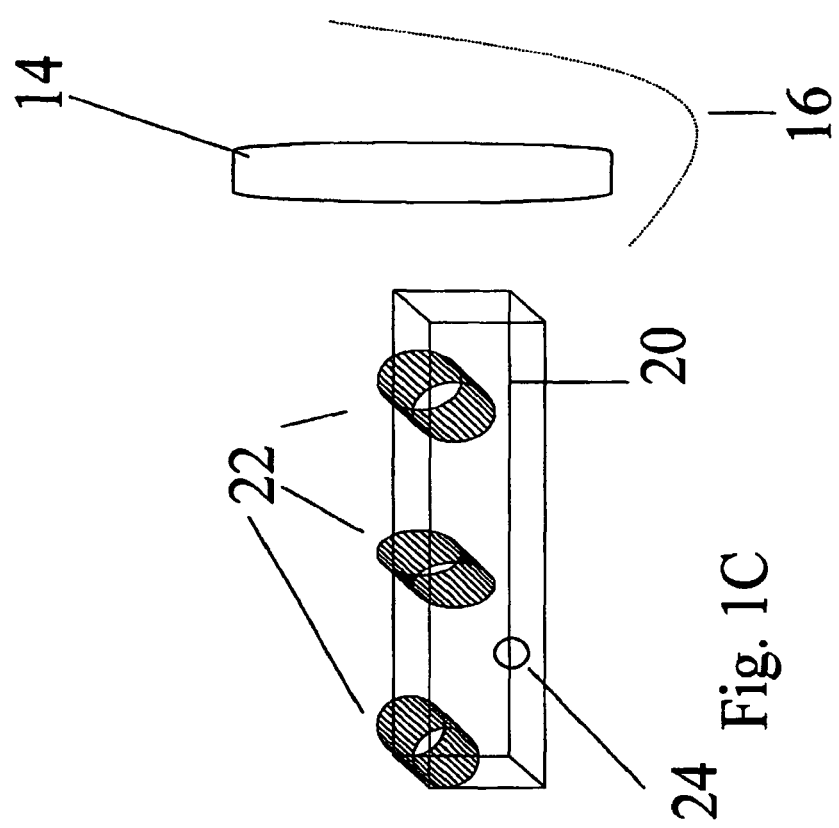

METHOD AND SYSTEM FOR OBTAINING POSITIONING DATA

CROSS-REFERENCE TO RELATED APPLICATIONS

This patent application is a continuation of U.S. patent application Ser. No. 10/510,228 filed on Oct. 13, 2004, which is a National Phase Application of International Application No. PCT/IL2003/000309 filed on Apr. 14, 2004, which claims priority from U.S. Provisional Application No. 60/372,197 filed on Apr. 15, 2002, and from U.S. Provisional Application No. 60/425,304 filed on Nov. 12, 2002, all of which are incorporated by reference in their entirety.

FIELD AND BACKGROUND OF THE INVENTION

The present invention relates to a method and system for obtaining two or three-dimensional co-ordinate data in space and, more particularly, but not exclusively to a positional element and supporting hardware and software for obtaining such co-ordinate information. In general terms one unit is able to determine the position, typically in relation to itself, of another unit.

The field of small space positioning, that is positioning within spaces of a few meters or less, includes a number of fields, principally pointing devices for computer interaction, and robotics and machine control, but also including toys, inventory control and other fields. Certain applications may require 2D solutions, others may require 3D solutions. Again certain applications such as pointing devices may require only one-way communication, whereas say robotics may require two-way communication.

1) Pointing devices.

Digital Pens:

Digital pens are pointing devices used for electronic detection of handwriting or hand drawing, or for general pointing. The digital pens generally use technologies such as acoustics, IR and light. Other versions use accelerometers that sense accelerations and transmit the data to a base station. Another version is a camera that analyzes small printing codes on special paper to determine its position. Other pens use electromagnetic (including passive & active), and other technologies for their operation. Some of the digital pens are an autonomous unit, meaning the pen works independently, providing its own fully processed co-ordinates as an output, and such is typical of optical and digital camera based units. Others, especially acoustic and electromagnetic devices, require a receiving or sensing unit.

Digital Pens are widely used with PC's, laptops, PDA's, cellular telephones, electronic books, and the like.

Interactive Whiteboards:

The interactive whiteboard is a whiteboard that captures written data from the board into an associated computer. One of the common technologies in this field is acoustic positioning: a marker is placed in a sleeve that transmits beacon signals which are picked up and analyzed by a dedicated device also placed near the whiteboard. In some cases an IR or electromagnetic signal is transmitted along with the acoustic beacon to for better accuracy and for simplicity. Another common technology is electromagnetic: the above mentioned marker sleeve transmits an electromagnetic field which is picked up by special loops on the back of the whiteboard.

Resistive technology is also used. In such a case the surface of the whiteboard is coated with resistive material. Pressure is applied to the coating, and the pressure causes a local change in the resistive properties of the board. From the changes, the controller is able to obtain an x, y position from the applied pressure.

Capacitive technology, which is similar to the resistive, can also be used. Again, pressure is used, this time to change the capacitive properties of the board. Then, the controller is able to obtain the x, y position Touch Screens:

Touch screens generally comprise sensors embedded within or near a computer screen in order to receive input from the screen. Some technologies include coating the screen with special material that can sense physical contact, the material being any of resistive, capacitive and SAW material. Other technologies include embedding of sensors around the screen. The sensors may be IR, acoustic, SAW and others.

3-D Mouse:

A 3D mouse uses electromagnetic or ultrasonic positioning techniques to indicate its position in 3-D space to a monitoring device. The cordless mice in use today use BlueTooth and similar radio and IR transmitters for wireless connectivity. The radio or IR only takes care of the wireless connectivity, that is the signaling issue. Positioning generally involves a movement tracker in the mouse itself, which may be optically based. Simple movement tracking gives a 2D solution. 3D solutions can be produced, for example using either of the following:

1) acoustic: the mouse emits ultrasonic and IR pulses which are received by a desktop receiver. By measuring the time of flight, triangulation can be performed.
2) IR sensors: the mouse emits IR pulses whose angle is measured by a desktop receiver. Several angle sensors allow making 3-dimensional triangulation thus obtaining the special position.

PC Tablets and Styluses:

The PC tablet uses a digital pen or stylus. The stylus enables interactions including writing directly on a graphic tablet, pc tablet, pc screen, pda screen, cell-phone screen and on any other computer enabled surface, screen or tablet. Available solutions work with passive or active electromagnetic or acoustic technologies.

Drawbacks

The solutions of the available technologies suffer from the following drawbacks. It is noted that these drawbacks are applicable to applications discussed below as well:

All of the solutions mentioned above require significant computation strength, and amplification and digitization circuitry. They do not utilize available resources of the main computer; instead they carry out their own calculations using dedicated hardware and feed the computer with the processed positioning data. The dedicated hardware is both expensive and complex, and is particularly wasteful of resources considering that the calculating power of the main computer is available.

All the technologies mentioned above, except the acoustic, need sensors on the positioning plane: the electromagnetic solution needs antenna loops on the back of the board, the pen with the camera needs special digitized paper and the touch-screens need special coatings. The need for sensors adds both to the cost of the final product, and furthermore provides an unnatural restriction on use in that it does not allow the user to use arbitrary planes, such as a cluttered desk surface, as a working platform.

The complex circuitry and sensors of these solutions require dedicated space. It is impossible to integrate the solutions to small and hand-held devices for which they have not been explicitly designed, such as PDA's, cellular phones etc. This issue is also significant with laptops and other movable products where the small size permits a fixed explicitly designed installation but does not allow for the freedom of an arbitrary device.

The installation of hardware components on a PC is tedious and not always reliable. It is significantly easier to use already installed components such as existing sound systems when adding a new feature.

There is no cross-platform solution currently available: a positioning solution for a touch screen is different from a digital pen solution for the mobile phone market, etc.

The integration of available solutions into an existing product is often ineffective, because of the size and the complexity of the project.

All the available solutions in fact require re-designing of the end product. There is no current solution that can be treated as add-in, requiring only software changes.

Support for multiple user applications is difficult and is currently only available where BlueTooth is the communication medium. Bluetooth is nevertheless restricted to eight simultaneous users.

Many of the available solutions require substantial power supply.

Some of the technologies are limited to two-dimensional location. But even those that can manage a third dimension do not currently provide accurate information of the third dimension. For example a stylus based on electromagnetic detection can be detected when hovering above a screen, but it is not possible to tell accurately how high it is. The detector simply determines that it is present.

There are other drawbacks specific to certain of the technologies. For instance, IR positioning has difficulties working with direct sun. Existing acoustic solutions have serious limitations in acoustically noisy environments, in particular in the all-important industrial environment, where ultrasound noise is most common.

Solutions that use wireless protocols as Bluetooth may suffer from protocol collisions, and from interference with other wireless equipment, such as WLAN equipment.

Touchscreen solutions are of course inherently two-dimensional.

2) Robotics and Machine Control

Robotics and Machine control is a field in which the use of position sensors is inherent to the control of moving elements.

Industrial Robots

Mechanical arms are able to perform delicate assembly tasks in 3-dimensional space. PCB assembly machines perform placement of electronic components on a 2-dimentional printed circuit board. CNC machines perform cut and drill tasks which need high position resolution. Automobile assembly lines use automatic drillers which drill the body of the car using high spacial accuracy.

Fax and Printer

Fax and printer machines have accurate position sensors for scanning, printing, paper orientation etc.

Freely Mobile Robots

In recent years several new robotics products have reached the prototype stage and beyond. The robotics products include freely moving robots for different applications. The applications include lawn mowers, pool cleaners, spy and bomb disposal robots with cameras and remote control and many more. Such robots typically use their own sensing together with pre-programming to find their way around in their surrounding environment.

Possible new applications include an autonomous vacuum cleaner. One or more vacuum cleaners may roam automatically around the premises, vacuuming dirt and transferring the dirt to either fixed location units or roaming units. The unit that vacuums may autonomously locate the receiving unit to which it delivers the dirt and dock therewith in order to deliver the dirt.

The sensors used in the robotics applications mentioned above use the following technologies:

1) Optical encoders: these sensors contain an enclosed rotating wheel with small holes on the perimeter of the wheel. An LED and a photosensor are mounted on either side of the wheel. As the wheel turns (due to the movement of the robot), the photosensor receives a series of light pulses. The light pulses encode the exact angle of the wheel, thus revealing the position of the moving arm. These sensors are also available as linear sensors, meaning that the sensor is not embedded on a rotating system but rather on a straight line.

2) Potentiometers: these sensors are attached in parallel to a moving object. The sensor changes its resistance as a function of its position.

3) LVDT: these are magnetic sensors which include 2 parts: an iron core and a magnetic cylinder. As the iron core moves inside the cylinder the magnetic properties of the cylinder change as a function of the position.

4) There are other, lesser used technologies of which the skilled person will be aware.

All the technologies mentioned hereinabove in connection with robotics are relatively large scale. They all have to be attached one way or another to a moving part of the robot and there is no wireless solution that enables the attachment of a sensor on the tip of the moving arm/robot etc. As always, precision goes along with cost, making precision equipment costly. Sensors that have high precision over a few meters of distance can cost hundreds of thousands of dollars and are not economically viable for many of the envisaged uses of robots.

3) Toys

It is relatively uncommon, due to the high cost, to have toys in which one unit can be aware of the location of a second unit.

In a very basic example, one toy notes that there is another toy nearby, prompting a reaction, for example talking. In a more sophisticated example, one toy knows more or less where the other toy is.

In the future it is hoped to provide a yet more sophisticated example in which one unit can successfully pass an object to the next one and vice versa. Further in the future a toy is envisaged, in which twenty-two soccer robots run around passing the ball one to another. The robots calculate where to kick according to the locations of the other robots on the same and opposite teams. To provide each of the twenty robots with the computing and control power in order to play a game of soccer produces a very expensive and complex solution.

Generally, toy technology has to be provided at low cost and current technology is relatively expensive. Specific technologies each have their drawbacks:

Infrared sensors—IR can be used to indicate the presence in the vicinity of a second object. At a higher level it can show a general direction.

Accelometers—the disadvantages of accelerometers are discussed above in the section on pointing devices.

Acoustic—Acoustic devices are relatively expensive. Only a single unit can be used in the same environment, energy use is relatively high, and the devices are difficult to miniaturize.

There is thus a widely recognized need for, and it would be highly advantageous to have, a positioning system devoid of the above limitations.

SUMMARY OF THE INVENTION

According to one aspect of the present invention there is provided a position detection system for use in association with computing applications, the system comprising:

a positional element for attaining a position and comprising a first emitter for emitting a substantially continuous ultrasonic waveform decodable to fix the position, and a detector arrangement for detecting the waveform in a manner permitting fixing of the position and outputting the waveform for computation, in a manner retentive of the position fixing ability.

Preferably, the detector arrangement is operable to emit the waveform decodable to fix the position, such that the waveform is decodable at low sampling rate.

Preferably, the waveform comprises a periodicity.

Preferably, the outputting comprises providing the waveform decodable at low sampling rate to at least one analog input of a computing device for the computation.

Preferably, the outputting comprises providing the waveform to at least two analog inputs of the computing device.

A preferred embodiment comprises a plurality of positioning elements, and wherein the detector arrangement is configured to supply respective waveforms as separate channels for the outputting.

A preferred embodiment comprises a plurality of detector arrangements to give greater detection precision.

Preferably, the separate channels are time multiplexed or frequency multiplexed.

Preferably, each positioning element further comprises a modulator for modulating the continuous wave.

Preferably, the modulator is a frequency modulator.

Preferably, each positioning element is provided with a frequency hopping sequence to allow simultaneous use of the plurality of positioning elements.

Preferably, each the frequency hopping sequence is a different pseudo-random sequence.

Preferably, the modulator is an amplitude modulator.

Preferably, the modulator is operable to modulate data additional to positional data to the waveform.

Preferably, each positioning element comprises a unique identifier.

Preferably, the continuous wave is modulated.

Preferably, the continuous wave is modulated using spread spectrum.

Preferably, the continuous wave is modulated using time division modulation.

Preferably, the positional element comprises a biometric sensor.

Preferably, the detection arrangement comprises a plurality of receivers, to provide multi-dimensional detection of the position.

Preferably, the outputting comprises providing the waveform decodable at low sampling rate to an analog input of a computing device for the computation and further is able to multiplex signals of the waveform from each one of the plurality of receivers for the inputting to the analog input.

A preferred embodiment makes use of a demultiplexing capability of the computing device to demultiplex the signals received at the analog input.

Preferably, the positional element further comprises a second emitter for emitting a signal additional to the continuous waveform and having a different speed therefrom, therewith to obtain data indicative of a distance between the positional element and detectors of the detector arrangement from a time delay between the continuous waveform and the additional signal.

Preferably, the additional signal is a light speed signal.

Preferably, the light speed signal is an infra-red signal.

Preferably, the outputting comprises providing the waveform to an analog input of a computing device.

Preferably, the analog input is an input to an analog to digital converter.

Preferably, the analog to digital converter is part of a sound card.

Preferably, the analog input is at least one of a microphone input, a line-in input, and a modem input.

Preferably, the detector arrangement is configured to be powered from the computing device via the analog input.

Preferably, the manner retentive of the position fixing ability comprises retaining the ability over low frequency sampling.

Preferably, the low frequency sampling comprises a rate compatible with Nyquist rate sampling of sound signals.

Preferably, the rate is below 50 KHz.

Preferably, the rate is substantially 44 KHz.

In an alternative embodiment, the rate is substantially 6 KHz. This lower rate is suitable for the lower sampling rate available at the A/D inputs of devices such as cellular telephones.

Preferably, the system further comprises a decoding unit for carrying out the computation to decode the waveform and indicate the position.

Preferably, the decoding unit comprises a maximum likelihood detector for carrying out the decoding by finding a most likely distance.

Preferably, the maximum likelihood detector comprises a channel model for modeling passage of the waveform from the positional element to the waveform decoding unit, thereby to provide a reference signal against which to identify the most likely distance.

Preferably, the maximum likelihood detector is followed by a correlator for confirming the most likely distance.

A preferred embodiment comprises a synchronizer for synchronizing between the detector arrangement and the positional element.

Preferably, the synchronizer is operable to use at least one of IR and RF signaling to carry out the synchronizing.

Preferably, the synchronizer is operable to monitor synchronization deviations thereby to reduce a frequency with which repeat synchronizations are carried out.

Preferably, the synchronizing is with a local oscillator at the positional element.

Preferably, the synchronizer is further operable to add a synchronization signal to the waveform, therewith to synchronize with a host device.

Preferably, the positional element is wired to the detector array.

Preferably, the positional element comprises a digital encoder for encoding digital data into the continuous waveform.

Preferably, the waveform decoding unit is provided as a client program for installation in a computing device.

Preferably, the waveform decoding unit is provided as a client program for installation in an operating system of a computing device.

Preferably, the waveform decoding unit is integrated with the detector arrangement.

Preferably, the positional element further comprises a pressure sensor to provide data of pressure being exerted on the positional element.

Preferably, the positional element further comprises attitude detection to provide data of an attitude at which the positional element is being held.

Preferably, the positional element further comprises:

a pressure sensor to provide data of pressure being exerted on the positional element, and attitude detection to provide data of an attitude at which the positional element is being held.

Preferably, the attitude detection comprises two waveform transmitters placed a predetermined distance apart on the positional element, each one for separate positional detection.

A preferred embodiment is usable to extract from a user of the positional element, a triplet of movement, pressure and attitude vectors.

A preferred embodiment comprises electronic signature functionality provided in the positional element.

A preferred embodiment comprises biometric signature functionality provided in the positional element.

Preferably, the positional element further comprises a receiver for receiving control data.

A preferred embodiment comprises functionality to relay data of the position to other elements.

In an embodiment, the detector array is associated with a cellular telephony device, thereby to provide writing input capability for the telephony device.

An embodiment comprises an application for using the writing input as a dialing input for the telephony device.

An embodiment comprises:

a location calculation application, and a handwriting to text conversion application, to provide a handwriting to digital interface.

The above embodiment may additionally comprise a text to speech conversion application and/or a language translation application, thereby to provide reading or translation from the handwriting input.

Another embodiment comprises:

electronic signature functionality provided in the positional element, and verifying functionality for verifying extracted triplets of user signatures, the system being operable to enable the electronic signature functionality with verification by the verification functionality of a user signature. The embodiment is useful for signature verification and may be provided along with point of sale devices and the like where signature verification is needed.

One embodiment of the positional element is a personal locator for attachment to a person, or is an item locator for indication of location of an item within a space.

Preferably, there is further provided an application for calculating the location and issuing control signals in response to the location.

Preferably, the control signals are at least one of signals to direct the focus of a stereo sound system, signals to direct a camera, signals to direct an incoming communication, signals to direct a robot, signals to direct machinery, signals to direct a predetermined sequence, signals to direct an assembly sequence and signals to direct a repair sequence.

A preferred embodiment comprises a plurality of units, each unit comprising one of the positional elements and one of the detector arrays, wherein each unit is operable to locate all adjacent units, thereby to provide chaining of the units.

Preferably, each unit in the chaining embodiment comprises a unique identifier. The embodiment is useful for keeping track of teams, and two-way communication within the units allows an intercom system along with the tracking.

In an embodiment, the positional element is part of a virtual reality game accessory, say a glove or a gun or the like.

According to a second aspect of the present invention there is provided a position detection method for use in association with a computing device having an analog input, the method comprising:

using a positional element to attain a position, emitting a substantially continuous ultrasonic waveform decodable to fix the position, and detecting the waveform in a manner permitting fixing of the position and outputting the waveform in a manner retentive of the position fixing ability, thereby to provide the computing device with an indication of the position.

Preferably, the outputting comprises outputting the waveform as an analog signal.

The method may comprise decoding of the waveform at the computing device to extract data of the position.

According to a third aspect of the present invention there is provided a position detection system of a computing device, the system comprising:

a positional element for attaining a position and comprising an ultrasonic continuous waveform emitter for emitting an ultrasonic continuous waveform decodable to fix the position, a detector arrangement for detecting the waveform in a manner permitting fixing of the position, and a signal decoder for receiving the waveform from the arrangement and decoding the attained position from the waveform.

Preferably, the detector arrangement and the signal decoder are connected via an analog link.

Preferably, the positional element is operable to emit the waveform decodable to fix the position, such that the waveform is decodable at low sampling rate.

Preferably, the waveform is a substantially continuous waveform.

Preferably, the detection arrangement comprises a plurality of signal detectors arranged at different locations each separately to detect the waveform, thereby to provide the position fixing as differential information between the detected signals.

Preferably, the signal decoder comprises at least one reference signal constructed using a model of the system and a maximum likelihood detector for determining a most likely position based on the reference signal.

Preferably, the decoder further comprises a correlator for using a correlation function to confirm the most likely position.

Preferably, the positional element is operable to emit a combination of signals having different speeds to allow a receiver to calculate a distance thereto from a time delay therebetween.

Preferably, the combination comprises a light speed signal and a sound speed signal.

Preferably, the light speed signal is an infra-red signal.

Preferably, the sound speed signal is an ultrasonic signal.

Preferably, the manner retentive of the position fixing ability comprises retaining the ability over low frequency sampling.

Preferably, the low frequency sampling comprises a rate compatible with Nyquist rate sampling of sound signals.

Preferably, the rate is below 50 KHz.

Preferably, the rate is substantially 44 KHz.

In an alternative embodiment the rate is substantially 6 KHz.

Preferably, the positional element further comprises a pressure sensor to provide data of pressure being exerted on the positional element.

Preferably, the positional element further comprises attitude detection to provide data of an attitude at which the positional element is being held.

In a preferred embodiment, the positional element further comprises:

a pressure sensor to provide data of pressure being exerted on the positional element, and attitude detection to provide data of an attitude at which the positional element is being held.

The above embodiment is usable to extract from a user of the positional element, a triplet of movement, pressure and attitude vectors.

The above embodiment may comprise electronic signature functionality provided in the positional element.

A preferred embodiment comprises electronic signature functionality provided in the positional element, and verifying functionality for verifying extracted triplets of user signatures, the system being operable to enable the electronic signature functionality with verification by the verification functionality of a user signature.

A fourth aspect of the present invention comprises a position detection system for use in association with computing applications, the system comprising:

a positional element for attaining a position and comprising a first emitter and a second emitter each for emitting a waveform decodable to fix the position the emitters being a predetermined distance apart, and a detector arrangement for detecting the waveforms in a manner permitting fixing of the position and permitting determination of an attitude of the positional element, the detector arrangement further being operable to output the waveforms for computation, in a manner retentive of the position fixing ability.

Preferably, the positional element further comprises a pressure sensor to provide data of pressure being exerted on the positional element.

Preferably, the waveform is one of an IR waveform, an RF waveform, an acoustic waveform and a continuous acoustic waveform.

Preferably, the outputting is in a manner suitable for supplying to an analog input of a computing device.

In one embodiment, the detector arrangement is an arrangement of orthogonal loops. Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or circuit including a dedicated CPU. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1C is a simplified schematic diagram illustrating a second alternative position detection system in which signal decoding is carried out in the base station and wherein the base station is a stand alone device.

DESCRIPTION OF THE PREFERRED EMBODIMENTS

Figure 1A:
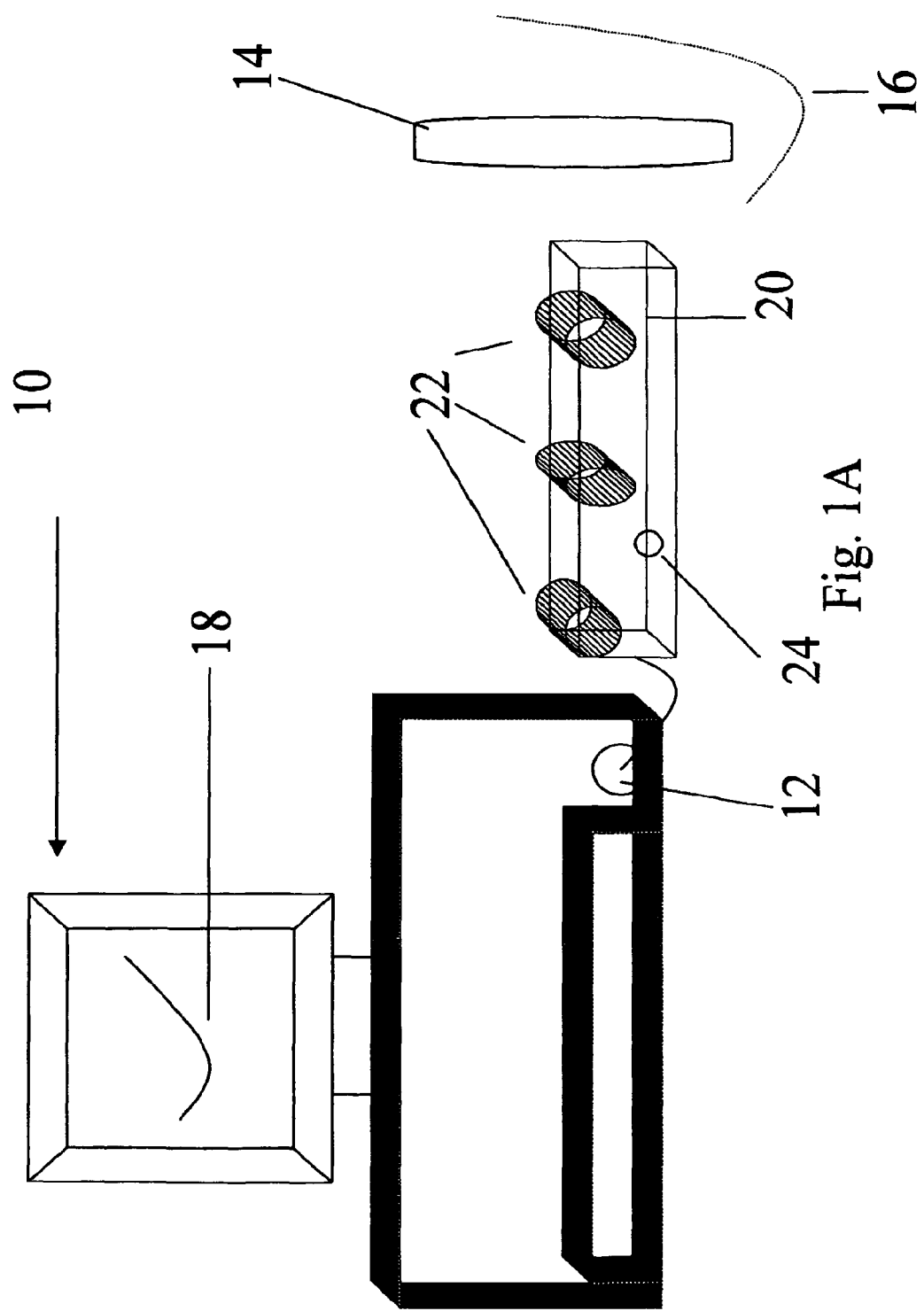
FIG. 1A is a simplified schematic diagram illustrating a position detection system according to a first preferred embodiment of the present invention.

The present embodiments disclose a system for determining the location of a positional element using continuous wave ultrasound signals and/or using detectors with multiple receivers, whose inputs are multiplexed and entered at a convenient analog input of the computing device with which it is desired to interact. The computing device uses its own resources to demultiplex the signals and determine the location of the pointing device. In an embodiment the signal is a synchronized combination of an ultrasonic and an infrared signal.

In a further embodiment the detectors may be a standalone device able to process the continuous wave output independently.

Another aspect of the presently disclosed embodiments concerns the ability to carry out position detection using low processing power to decode the signals.

The principles and operation of a pointing device and system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1A illustrates a position detection system operative in accordance with a first preferred embodiment of the present invention. The system is designed for use in association with a computing device 10 having any kind of standard analog input 12.

The system comprises a positional element 14, which takes up a position to be detected. The positional element may be a pointing device, for example a stylus or a mouse or the like which a user moves in order to interact with the computing device 10, or it may be a part of a robot or a playing piece for a game or any other kind of device whose position needs to be determined. The movement of the positional element 14 is tracked and the computer uses the movement or positioning of the element as an input to any current application that is able to make use of the input. Generally a mouse or like device tends to be movement tracked whereas a stylus tends to be position tracked. Robots and game pieces may be either position or movement tracked depending on the application. In either case the positional element simultaneously attains a position and emits signals which can be decoded to fix the position. If the positional element moves over a locus such as that indicated by dotted curve 16 then a suitable application may trace a corresponding curve 18 on the computer screen. Likewise the positional element may be used to write directly on the screen.

The system further comprises a detector arrangement or base station 20, which detects the signals emitted by the positional element 14 in a manner that permits fixing of the position. That is to say the signal is designed to contain enough information to enable signal processing to fix the position of the positional element.

The signals are preferably detected at two or three separate detectors 22 which are spaced apart. The number of detectors 22 is preferably selected for the number of co-ordinates that are required, that is to say the number of dimensions in which it is desired to follow the movement of the pointer. The base station preferably does not itself use the signals to calculate the coordinates of the pointing device but rather multiplexes the signals together onto a single channel. The channel is then provided to the analog input 12 of the computing device. The computing device simply needs to demultiplex the signals as received on its analog input and carry out triangulation or the like to assign co-ordinates to the pointing device. In a preferred embodiment each detector picks up the same signal from the pointing device. However, because the detectors are at different positions, a phase difference or a time lag or the like is introduced, so that a position can be calculated from a differential between the detected signals.

There are numerous methods for providing signals that permit position detection or for introducing the differential referred to above. A preferred option is for the pointing device 14 to emit a combination of signals having different speeds. A receiver can then use the difference in arrival times of the two signals to calculate a distance to the receiver. Comparison of such distances between two receivers allows a two-dimensional position to be calculated and comparison between three receivers allows a position in three dimensions to be calculated.

Preferably the pointing device 14 uses a combination of a light speed signal such as an infra-red signal and a sound speed signal such as an ultrasound signal. The distance to each receiver can then be calculated from the difference in arrival times of the two signals. It will be appreciated that the arrival of the infra-red signal is effectively instantaneous so that the base station 20 can be simplified by having a single infra-red sensor 24, and the two or three separate sensors 22 can be for sensing ultra-sound only.

In one preferred embodiment, the analog input 12 is any input having access to an A/D converter. A typical example is the microphone input to a sound card. Another example is the line-in input to the sound card, and also a modem input can be used. Generally a sound card has adequate processing ability both for demultiplexing and dealing with ultrasound signals, as will be discussed in greater detail below. If using the sound card then the microphone input is advantageous as it is able to power the base station.

The present embodiment, by utilizing the analog input and on-board processing ability, enables any machine that can digitize analog audio signals, for example PC's and larger computers, laptops and smaller computers including PDAs, cellular telephones, and other computing devices, to have a positioning ability added to them. In the case of the PC and the laptop, the processing ability can conveniently be the digital sound capability that is practically universally available on these machines.

It is advantageous to use small, low cost hardware for the pointing device and sensors, whilst using the computation resources of the computing device itself to compensate for the simple hardware, thereby enabling even sophisticated multiple position pointing for very little cost, as will be explained below.

As described above, in one preferred embodiment, a standard microphone input serves as an interface between various different sensors used for position detection, be they microphones, photo detectors, antennas and the like, and the computing device. With such an embodiment, any apparatus that has a free input which is sampled by A/D circuitry can use the embodiment in order to provide positioning ability without any hardware changes inside the apparatus. In typical devices, A/D sampling is carried out following filtering and amplification.

It will be appreciated that appropriate client software is preferably located within the computing device, in order to retrieve the positioning data from the raw input signals.

Although the embodiment just referred to uses the microphone input, it will be appreciated that any analog input is suitable. Many PC's and laptops have more than one analog input, for example: microphone inputs, line-in inputs, and a modem input. Each of these analog inputs may be used as the connection to the positioning system described herein. However, microphone inputs have certain advantages over other kinds of analog inputs. Notably, power for the base station can be obtained from the microphone jack, and thus no separate connection is needed for the power source.

A disadvantage specific to a modem input is that many modems do not have the ability to transfer raw data from the modem jack to the PC's memory. Instead, the data transferred from the modem is automatically processed as modem information.

A disadvantage common to modem and line inputs is that the signal levels on the modem input and the line input must be higher by an order of magnitude than the signals on the microphone input. This adds a requirement for additional complexity and circuitry to the positioning system.

Figure 1B:
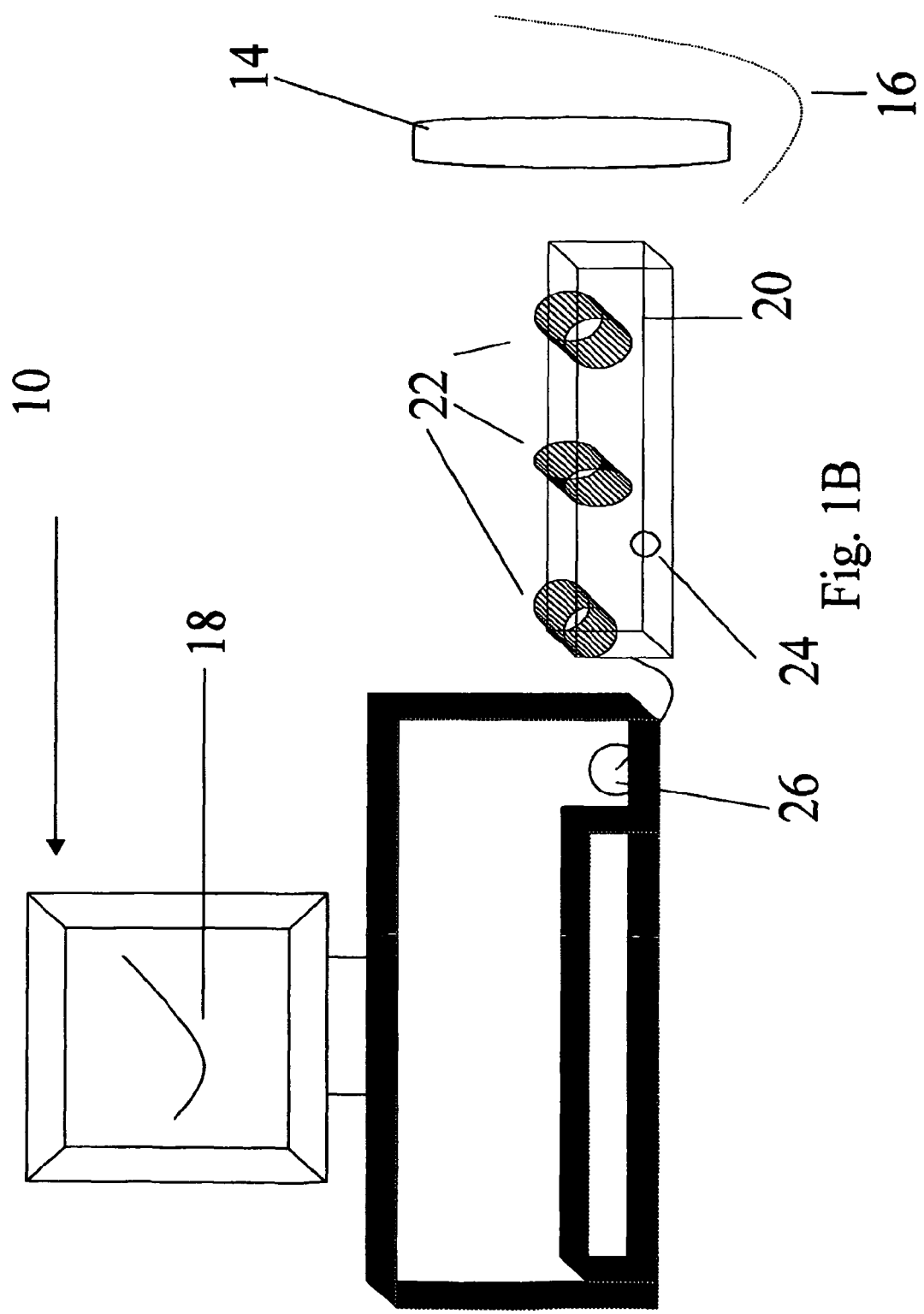
FIG. 1B is a simplified schematic diagram illustrating an alternative position detection system in which signal decoding is carried out in a base station and processed data is passed to an associated computing device.

Reference is now made to FIG. 1B, which is a simplified block diagram illustrating a second preferred embodiment of the present invention. Parts that are the same as in previous figures are given the same reference numerals and are not described again except to the extent necessary for an understanding of the present figure. The embodiment of FIG. 1B differs from that of FIG. 1A in that decoding of the signals received from the pointing device is carried out in the base station 20. The base station thus is able to output digital co-ordinate position information regarding motion of the pointing device 14. Thus the base station does not need to be connected to the analog input 12 and may instead be connected to any suitable digital input, or may be for stand alone use.

The positioning system of FIGS. 1A and 1B consist of 3 parts:

1. a positional element 14. As described above, the positional element may be in the form of a mouse, stylus, or light pen, or it may be a robot or part of a robot or a playing piece in a game or any other element whose position may need to be tracked. For example an electronic game of chess or the like may use playing pieces which are all positional element according to the present embodiments.

2. an array of sensors 22 and pre-processing hardware, preferably arranged together into base station 20 which connects to analog input 12, such as a microphone jack. In the embodiment of FIG. 1B, a CPU may be added to allow for full processing of the data within the base station 20 so that actual absolute or relative co-ordinate information is the input sent to the computing device, in which case a standard digital input may be used instead. Alternatively the embodiment of FIG. 1B may be reserved for standalone use, in which case it supports its own applications and does not connect to a computer.

3. Client software including an algorithm which decodes the signal information data and outputs the position coordinates. It is noted that the client software may be provided with the system as a system driver, or may be incorporated into an operating system or may be provided as part of an application intended to use position data from the system.

A non-exclusive list of possible uses for the system include:

Converting a standard screen to a "touch screen". The screen itself can be a conventional screen, yet the stylus has a contact sensor to indicate whether it is in contact with the screen, and the position sensing works independently of the screen. The result is a device that looks and feels like a touch screen and yet does not require the materials and complexity that goes with having a touch screen. The same principle may of course be applied to a writing pad or any other kind of surface. The pressure sensor may be a piezoelectric crystal.

Interactive white board with the sensing device attached to a standard whiteboard. Again the result looks and feels like a standard whiteboard, yet the board need contain no electronics or special materials at all.

Digital writing pad: In a digital writing pad, standard A4 or any other size paper can be used, and a base station located in the vicinity can detect the movement and produce an electronic version of the movement of the pen.

Gaming. As described above, positional elements or pointing devices can be constructed in the form of playing pieces.

Digital drawing boards and interactive books.

Digital signature applications, for example incorporating the ability to capture unique digital signatures and use them in verification of authenticity for documents, and other issues. The application is described in greater detail below.

Robotics applications (see above)

Digital pen for cell/pda/pc etc.

Toy and game type applications.

Inventory tracking applications.

The user is preferably supplied with sensing array apparatus or base station 20 and pointing device 14. As will be described in greater detail below, the pointing device 14 preferably emits acoustic, and IR or electromagnetic signals. The emitted signals enable the array or the computing device or combination thereof to calculate the position of the pointer, and provide the calculated position to a local operating system or requesting application.

Principle of Operation

The system is intended to be interfaced to the analog input of a computer or like device. A particularly useful analog input is the microphone input, and in order to interface to a standard microphone input, the following issues are considered:

1. PC's, PDA and cellular telephones generally have only one microphone input. Yet the sensing array has two, possibly more, sensors and may also be required to service standard microphone input. As explained above, the problem of inputting signals from multiple sources to a single microphone input can be solved relatively simply by multiplexing. There are two preferred kinds of multiplexing: time division and frequency division multiplexing.

2. The input bandwidth of a typical and widespread sound card type, the Sound Blaster® for PC's does not exceed 22 KHz for the most advanced models. Indeed, in order to provide a system that is compatible with earlier models, an assumption of 10 KHz is preferably designed for. With PDA's and cellular telephones, input bandwidth is typically below 3 KHz. Transmitting frequencies in the 0-10 KHz band, and even more so in the 0-3 KHz band, is not practical because of the annoyance it causes users, and because of poor SNR. Indeed, much of the day to day acoustic noise resides in the lower frequencies covered by these bands. On the other hand, ultrasonic frequencies only begin above 22 KHz and thus, in order to use ultrasonic waves with the sound card electronics, frequency down conversion is preferred.

3. A power supply is needed for the additional electronics. As mentioned above, the microphone input can be used as a power source. In use, a charging channel can be multiplexed alongside the signaling channels to charge the base station 20. Additionally or as an alternative, it is possible to store kinetic energy generated by the user's movements and convert the kinetic to electronic energy, thus eliminating the need for a battery or prolonging battery life.

4. Sampling frequency: most of the Sound Blasters® sample at rates up to 44.1 KHz, the Nyquist rate, and other sound cards have similar behavior. PDA's and cellular phones sample at rates of 6 KHz. The sampling rate provides a limitation on system design that implies that the synchronizing signals emitted from the pointing device are required to retain position data with sufficient accuracy even at low sampling frequency. Sharp microsecond "delta" pulses, commonly used by other positioning systems, are incompatible with the sampling rates available. Preferably, substantially continuous signals are used.

The preferred embodiments include wireless communication between the pointing device 14 and the base station 20, which is connected to the computer's microphone input. A simpler embodiment uses wired communication in which there is provided a cable connection between the base station and pointing device. The embodiment is particularly useful in a "mouse"-type implementation where relative position or movement is wanted and such an implementation is particularly simple and cost effective. However, a wired solution is not appropriate for many applications and thus a wireless solution is also needed.

There are several known ways of determining the position of the pointing device, as described above. Each of the known methods can be incorporated into embodiments of the present invention. In particular, dedicated circuitry preferably converts sensor output into signals that can be fed into a standard microphone input. A number of preferred embodiments are described in greater detail hereinbelow.

Acoustic Positioning

A preferred embodiment utilizes acoustic positioning. The idea of acoustic positioning is to measure a time difference between two signals of different speeds arriving at the sensor array. The time difference gives an indication of the distance to the source. If two different sensors are used then triangulation can be used to fix the source position. If three appropriately located sensors are used then a position in three dimensions can be obtained. The two signals are, in a preferred embodiment an acoustic signal and an IR or other electromagnetic signal.

The velocity of sound waves at sea level is a known value. The IR or other electromagnetic signal travels at the speed of light and for the purposes of the precision levels of such a pointing device, is treated as being instantaneous. A co-ordinated release of the IR and sound signals is made. Then delays are measured between the arrival of the IR signal and the two versions of the sound signal at the two sensors. The two delays are converted into distance and the distances can be triangulated with the known distance between the microphones to give a 2-dimensional coordinate. A third microphone can receive a third version of the sound signal from which a third delay can be used to add a third co-ordinate. Suitable placement of the microphones may give an accurate three-dimensional co-ordinate.

In a further preferred embodiment it is possible to replace the IR sensor and the IR signal by an additional microphone. The result is greater calculation and a degradation in accuracy but greater device simplicity.

The above embodiment is relatively straightforward, and is applicable to hardware provided in some existing pointing devices.

The Pointing Device

Figure 2:
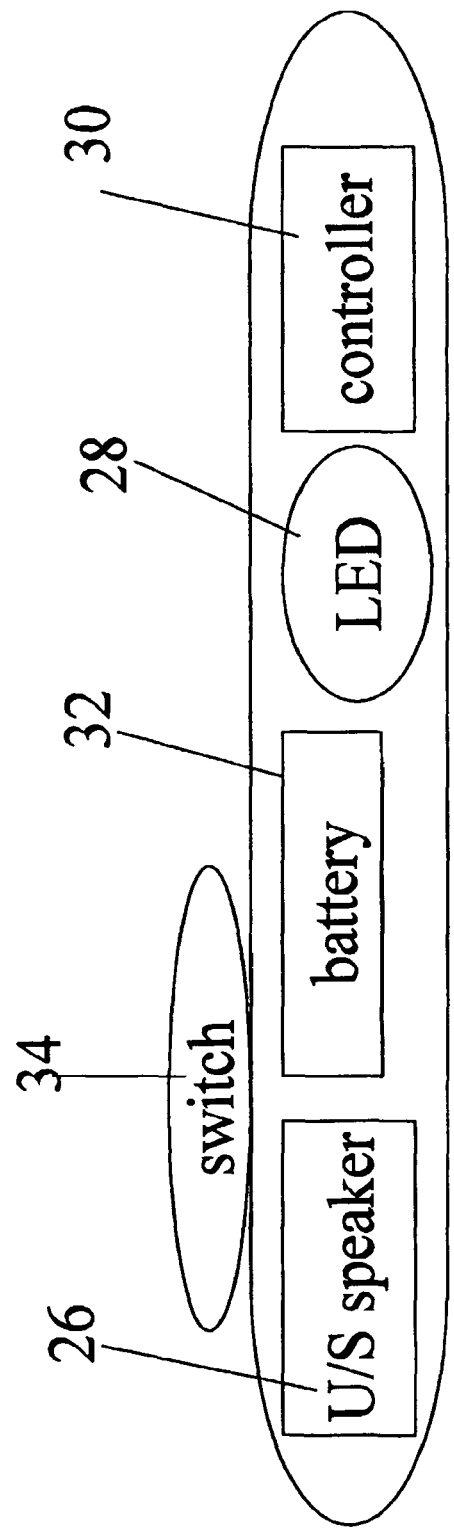
FIG. 2 is a simplified block diagram of a preferred embodiment of the pointing device of the system of FIG. 1.

Reference is now made to FIG. 2, which is a simplified diagram illustrating a positional element suitable for use in the above-described acoustic positioning embodiment. The positional element 14 is in the form of a pointing device and comprises a miniature speaker 26 which serves as a transducer to produce sound from electrical signals. The speaker is preferably optimized for ultrasonic wavelengths. In addition an LED 28 may be provided to transmit the second, substantially instantaneous, signal. Instead of an LED, an antenna may be used to transmit other RF signals of suitable frequencies.

Controlling logic 30 is preferably implemented by a microprocessor and provides coordination between the speaker 26 and the LED 28, to give a signal combination from which a meaningful delay can be determined. The controlling logic may provide other controlling functions as deemed necessary.

Battery 32 provides power for the pointing device 14. In an alternative embodiment the battery can be replaced by an inductive coil which is powered by induction from the base station. Such an alternative saves the need for battery replacement in the pointing device but limits range and adds complexity to the base station.

A switch 34 may optionally be provided. The switch may be provided for any of a range of functions or may simply provide a signal whose purpose is decided by the operating system or application to which the signals are eventually submitted. For example the switch may be used to change the color of lines traced out on the computer screen, or in place of mouse clicks, or for shooting in games, or for indicating contact with a screen surface. In the latter case the switch may be designed to close upon physical contact with the screen.

Base Station-Side Hardware & Sensors

Figure 3A:
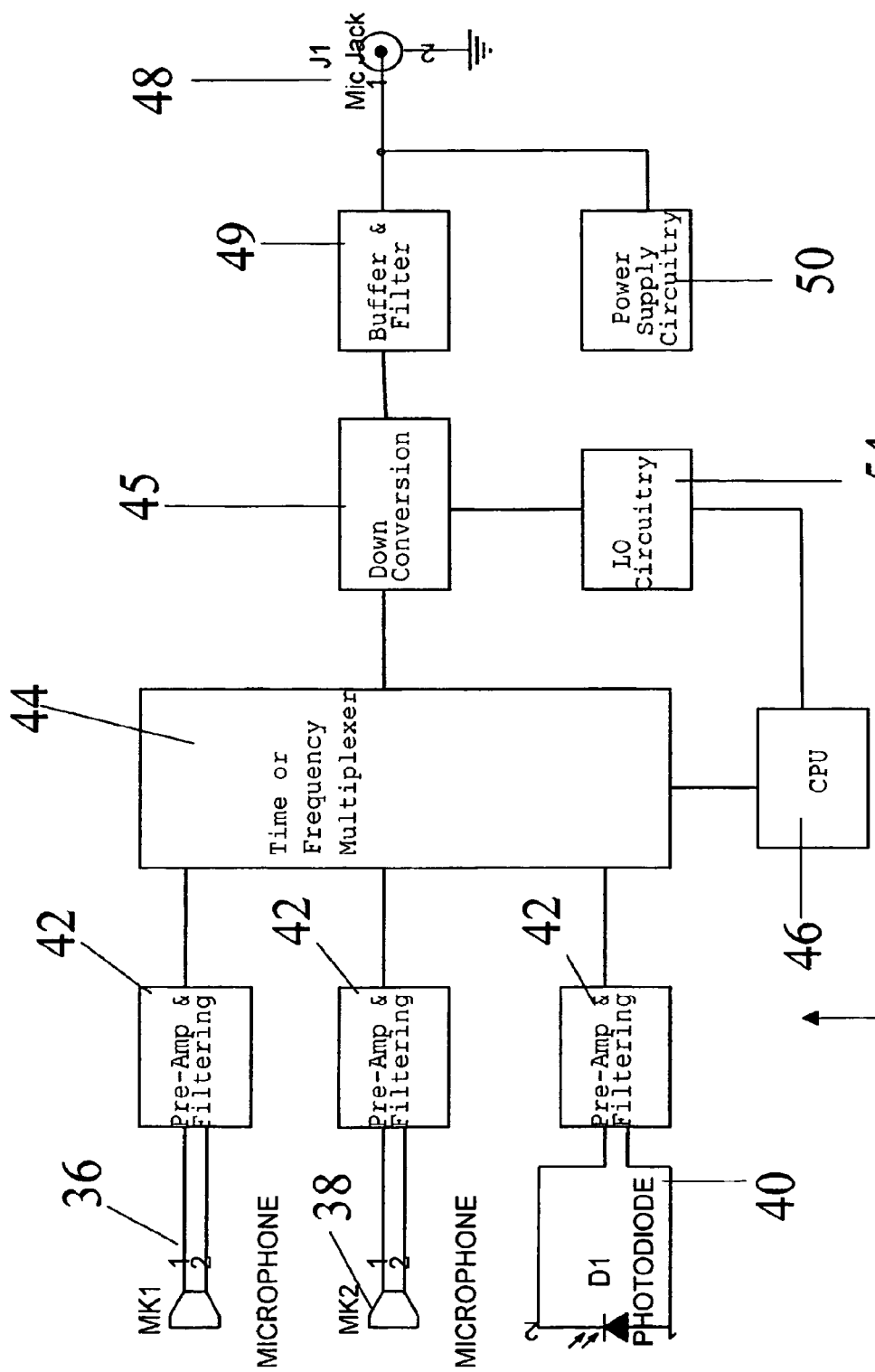
FIG. 3A is a simplified block diagram of a preferred embodiment of the base station of FIG. 1.

Reference is now made to FIG. 3A, which is a simplified diagram illustrating the internal components of a base station suitable for use with the pointing device of FIG. 2. The base station preferably comprises an array of at least 2 microphones 36 and 38 to pick up the signal from speaker 26. It will be appreciated that the microphones act as transducers to convert the sound back to electrical signals. In addition, an IR photodiode 40 detects the IR signal from LED 28. In a variation, an antenna may replace the IR photodiode, as explained above.

Pre-amp and filtering circuitry 42 is preferably provided for each of the sensors 36, 38 and 40. Time or frequency multiplexing functionality 44 allows the signal to be multiplexed onto a single channel. Frequency down-conversion and mixer functionality 45 allows the signals as received to be converted downwards to frequencies compatible with the analog input that is being used.

A microprocessor 46 or other controlling logic is used to control and co-ordinate the base station. Synchronization data allows the microprocessor to synchronize the signaling components.

A cable and jack 48 are provided for connection to the computing device's microphone socket, or any other input having an A/D converter. Data into the analog input is preferably buffered and filtered by buffer and filter circuitry 49. Buffering may be different depending on whether a microphone socket or some other input is used.

Power supply circuitry 50 permits usage of the microphone jack simultaneously as a power source for the base station and for data output.

When using a host CPU to decode the positioning data transferred from the analog input, there is an inherent problem of synchronization. The clock of the positional element, that is the pointing device or wireless terminal, is not synchronized with the base station, which in turn is not synchronized to the host device's A/D converter. The synchronization of the wireless terminal and the base station can be achieved with IR or RF signals, as described herein. Synchronization further on down the line with the host time base is in many cases impossible. Even with a relatively high sampling rate such as 50 KHz, the mismatch between the IR synchronization signal and the A/D sample may be in the order of 20 uSec, which correspond to few centimeters in the measured location. Such imprecision is not suitable for most applications. Furthermore, even if good synchronization is achieved at a certain instance, the clocks of the two systems, namely the host and the base station, tend to drift over time due to limited accuracy of existing crystal technologies.

To overcome the above-described host synchronization issue, the base station preferably uses a certain time or frequency slot to transmit to the host a synchronization pattern which is at the Nyquist rate of the host A/D converter. The host can use the pattern to determine the phase difference between its own clock and the positioning time base clock.

The synchronization pattern can be transmitted at a regularity sufficient to compensate for clock drift, and there is no need to send such a signal at every loop cycle.

In a further preferred embodiment, the base station circuitry sends commands to the positional element, whether by acoustic, light, infra-red, RF or any other form of signal that the pointing device is capable of responding to. In such an embodiment, the positional element 14 has RF or light receivers. Upon reception of a command, the pointing device may emit a signal such as the acoustic signal discussed above. The time of emission of the instruction from the base station is known, and can be used to start timing a delay in receipt of the acoustic signal. The respective delays of the acoustic signals at the different microphones can again be used to arrive at position co-ordinates.

Figure 3B:
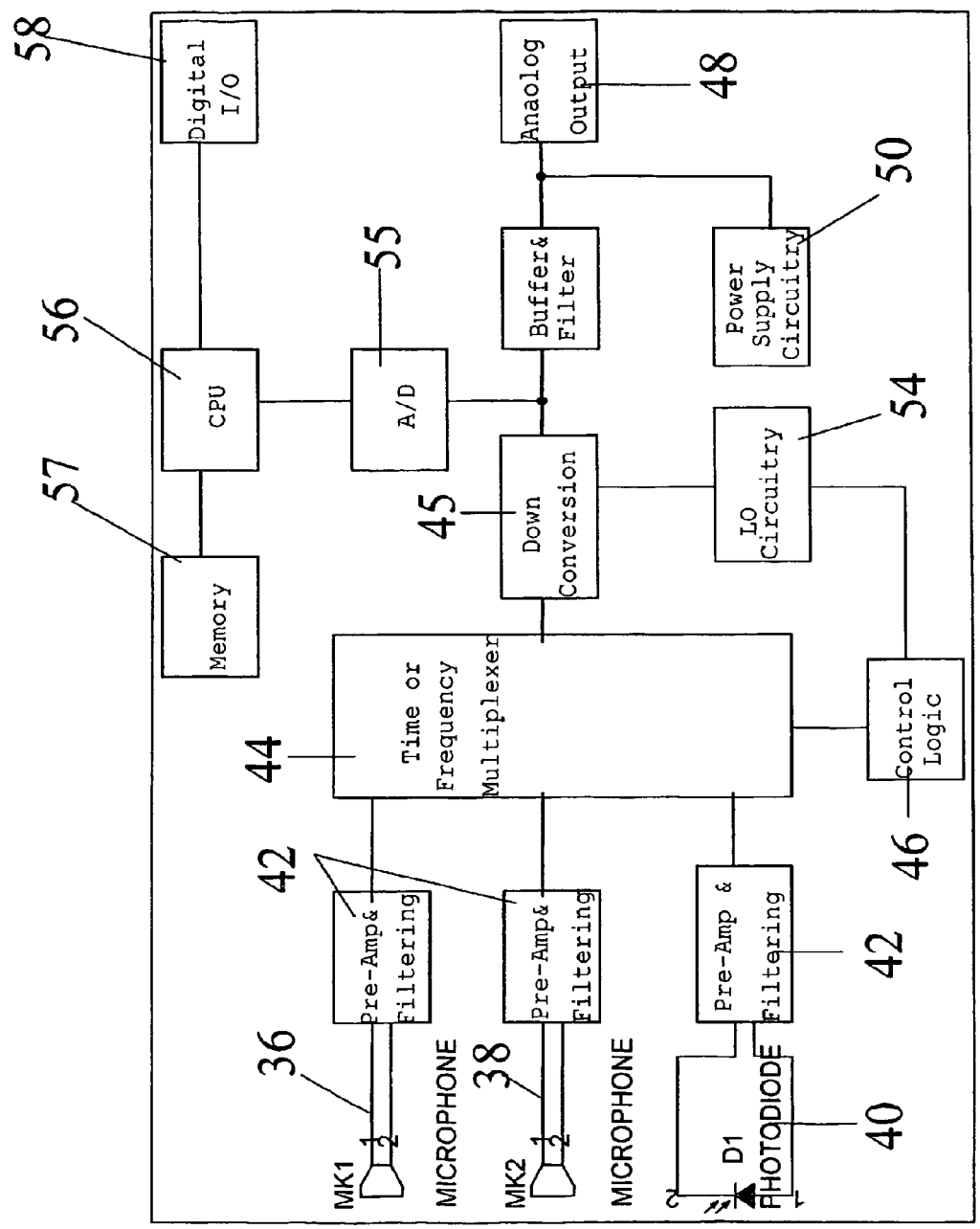
FIG. 3B is a variation of the base station of FIG. 3A for use as a standalone device, that is to say not relying on a computing device to carry out detailed calculations.

A base station for the embodiment of FIG. 1B is shown in FIG. 3B. Parts that are the same as in FIG. 3A are given the same reference numerals and are not described again except to the extent necessary for an understanding of the present figure. In FIG. 3B, an A/D converter 55 takes the output of the down conversion 45 and provides it to CPU 56. CPU 56 is connected to a memory 57 and a digital data port 58. The CPU carries out decoding of the waveform to determine the position of the positional element 14 and may additionally run applications using the positional information thus determined. The features are preferably provided within a base station chipset. The solution leads to a more complex and therefore costly base station than that of FIG. 3A. However, the circuitry can be dedicated for use with the signal-to-coordinate decoding algorithm to be described below, and thus is still relatively simple in comparison with currently available solutions.

Decoding Algorithm

A decoding algorithm is preferably provided to convert digitized versions of the pointing device signals into position coordinates for passing to a local operating system or directly to an application or the like. The algorithm is preferably provided as part of client software for the computing device, either as a driver for the base station or built in to the local operating system or exceptionally as part of a specific application. In the embodiments of FIG. 1B the algorithm may be incorporated into the base station electronics.

The algorithm preferably takes into account the relatively low sampling frequency capabilities likely to be available by carrying out frequency down conversion. The conversion reduces the data frequency from the relatively high frequencies needed for transmission from the positional element to the relatively low frequencies that installed sound hardware is likely to be able to sample and digitize. In addition the algorithm preferably includes an ability to handle noise and is preferably adapted for specific issues in the handling of low frequency signals in general.

As mentioned above, the known art in the position location field concentrates on the use of very short and energetic acoustic signals as the location signal. In order to achieve good resolution, the known solutions dictate high sampling frequencies, typically higher than 400 KHz, in order to be able to find such short location signals and not miss them entirely. The present embodiments by contrast preferably do not use sampling rates higher than 44.1 KHz, since such frequencies are incompatible with the installed base of sound processing equipment. Furthermore, it is recommended to keep the beacon signal sound frequency higher than 20 KHz, that is within the ultrasonic range, so that users do not hear it. These two demands require a solution in which data is modulated over an ultrasonic carrier signal or waveform. The data can be frequency modulated (FM) or phase modulated (PKI) onto the carrier comprising the ultrasonic signal, or any other known method may be used. The algorithm preferably operates to decode the modulated signal and to reconstruct the original position-information bearing signal from the results of sampling thereof. In the present embodiment it is preferred to use band-limited signals in order to achieve a desired resolution level.

Preferably, continuous wave (CW) modulations such as spread spectrum and frequency hopping are used, in acoustic position finding, to overcome reverberation and multipath effects.

Typically, more than one detector is used, and the signals from the detectors are multiplexed for a single input. In certain cases, the need for multiplexing may be avoided. For example, in the case of a stereo input sound Blaster® or similar stereo sound card, one can feed two signals into the microphone input, and another two signals to the "Line-In" input, making a total of four signals that do not need to be multiplexed together. Thus, the base station does not require a time division multiplexer for input access purposes. Rather, up to four sensors may be fed directly to the sound card, and the sound Blaster's® internal circuitry is then able to take care, using an appropriate software driver, of the received signals. It is noted, however, that even stereo input sound blasters have a maximum of two A/D converters, so that time division multiplexing is still needed to enable the sound card to carry out sampling over more than two channels simultaneously.

In order to enable the stereo input sound card to sample four separate channels over two A/D converters, the transmitted signals may thus be synchronized with each other by the base station. Such synchronization may be achieved in a number of ways. One way is to send synchronization data from or to the base station alongside the signals themselves. Another method requires cyclic transmission, that is to say the signals are sent in a coordinated manner so that a signal period or phasing between the channels that is known to both sides is used. The methods hereinbefore described thus provide data synchronization, both with and without an internal time division mechanism.

It is pointed out that the use of the separate stereo inputs, as described above, has certain drawbacks in comparison to other embodiments described hereinbefore. Thus for example there maybe a phase difference between sampling carried out at each of the two A/D converters, and thus a calibration stage has to be performed before using the system. Otherwise, the phase difference itself may confuse the distance determinations, leading to reduced accuracy.

Another drawback is that relatively complex software driving functionality is required to keep switching timing between the microphone input and the "Line In" input as accurate as possible. A jitter of a mere 1 μSec between the switching timings can result in 0.3 mm of measurement inaccuracy at room temperature.

In addition much of the installed sound card base only allows for mono input. Very few sound cards are equipped for stereo microphone input.

Additional cost may be added because, in order to use the additional inputs, an additional connector and wiring have to be provided on the base station, which most users will not be able to utilize.

A preferred embodiment of the present invention uses a maximum likelihood detector for decoding the signals received from the sensors to determine the distances to the individual sensors. At the maximum likelihood detector, the signals received from the sensors, via the base station, are compared to reference signals. The comparison indicates a most likely signal and from the most likely signal a distance is determined as the distance from which the signal was most likely transmitted.

Figure 4:
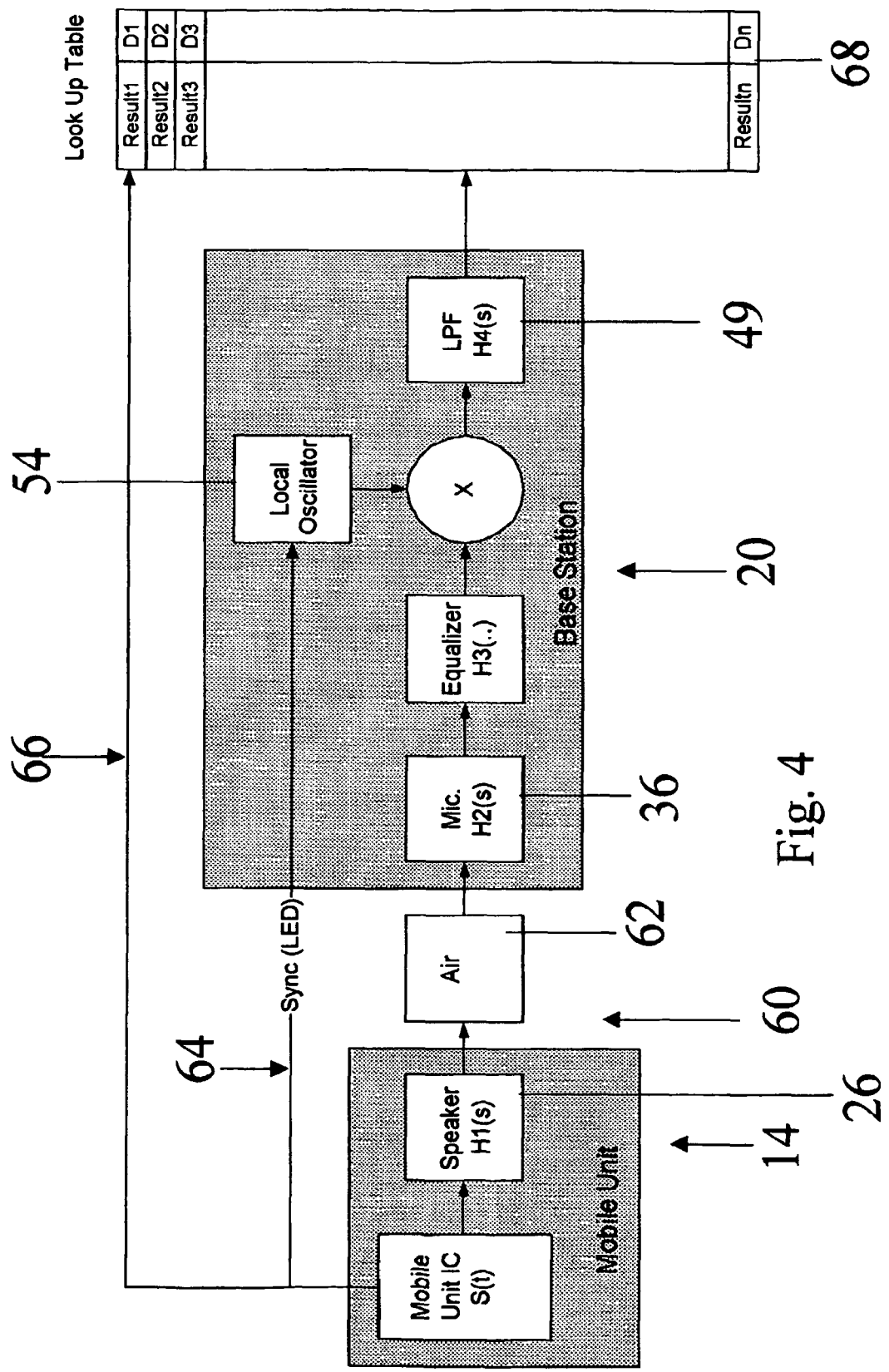
FIG. 4 is a simplified block diagram of a mathematical model of the system of FIG. 1 for use in constructing reference signals for maximum likelihood detection.

The maximum likelihood detector preferably uses a full mathematical model of the channel to construct a look up table of reference signals against which to compare received signals so that a best match distance can be found. As an alternative, the expected waveform can be sampled at the Nyquist rate, and any timing mismatch between the sampling points can be overcome by extrapolation functions, to reveal the distance. Reference is now made to FIG. 4, which is a simplified block diagram indicating typical components of a mathematical model for incorporating into a maximum likelihood detector of the kind considered above. The model 60 comprises an initial signal sequence S(t) which is fed into the transfer function H1(s) of the transducer 26 within the mobile unit 14. The mobile unit is followed by air gap 62 which is modeled simply as a delay. The air gap is altered for different distances. The result is then fed to the reception path in the base station 20 which includes transfer function H2(s) for the microphone 36, equalization H3(s), and low pass filtering H4(s) as well as mixing and any other features of the path. The full modeling of the channel is useful in the design of the maximum likelihood detector in that it allows accurate expected signals to be constructed against which the received signals ideally differ only in phase. The detector is then relatively easily able to distinguish the most likely signal, which in turn corresponds to the most likely distance.

The IR signal is used in the maximum likelihood based scheme both to set the start of the delay and also to synchronize clocks between the mobile unit and the base station. Synchronization path 64 is indicated on the model. Specifically, path 64 provides a synchronization signal to the local oscillator.

The skilled person will appreciate that acoustic signals have differing angular transfer functions. An equalizer can be added to the base station in order to compensate for this fact.

The IR (or other electromagnetic) signal preferably also points, via a second path 66, to a start time equivalent to a zero distance in a distance look up table 68. The most likely signal obtained by the maximum likelihood detector is then used to identify a most likely non-zero distance from the look up table. The skilled person will appreciate that, instead of a look-up table, it is possible to use an array generated on the fly. Furthermore, other detectors may be used; and there are several known decoders of FM signals, such as PLLs, I/Q demodulation, phase multiplication etc.

Figure 5:
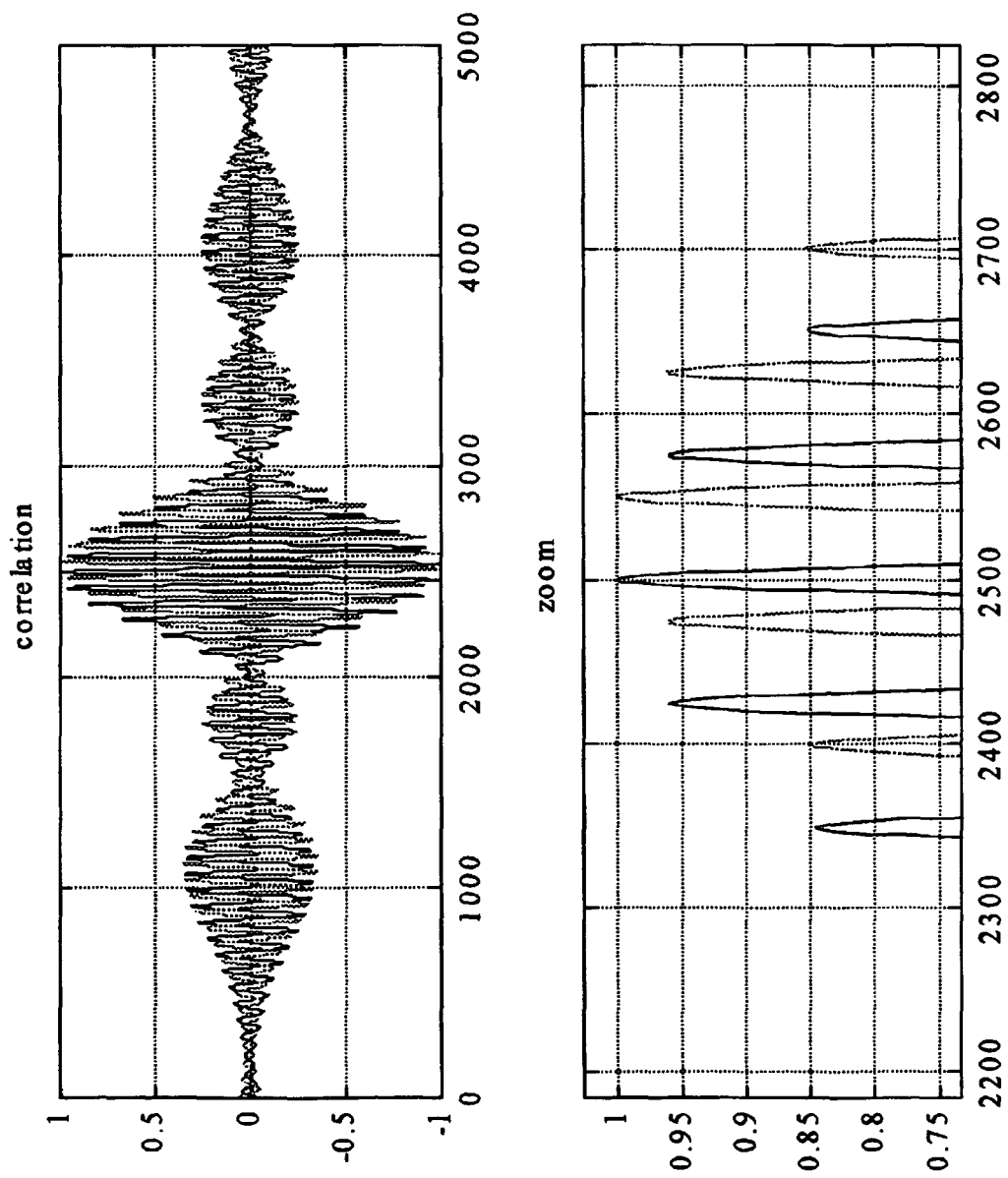
FIG. 5 is a graph showing a correlation function for use in a correlator for confirming a detected position.

The maximum likelihood distance may then be tested by means of correlation, and reference is briefly made to FIG. 5, which is a two-part graph showing a typical correlation function that may be used. The top part of the graph shows the function, and the lower part of the graph is an enlarged or zoomed view of the upper central part of the graph.

Figure 6:
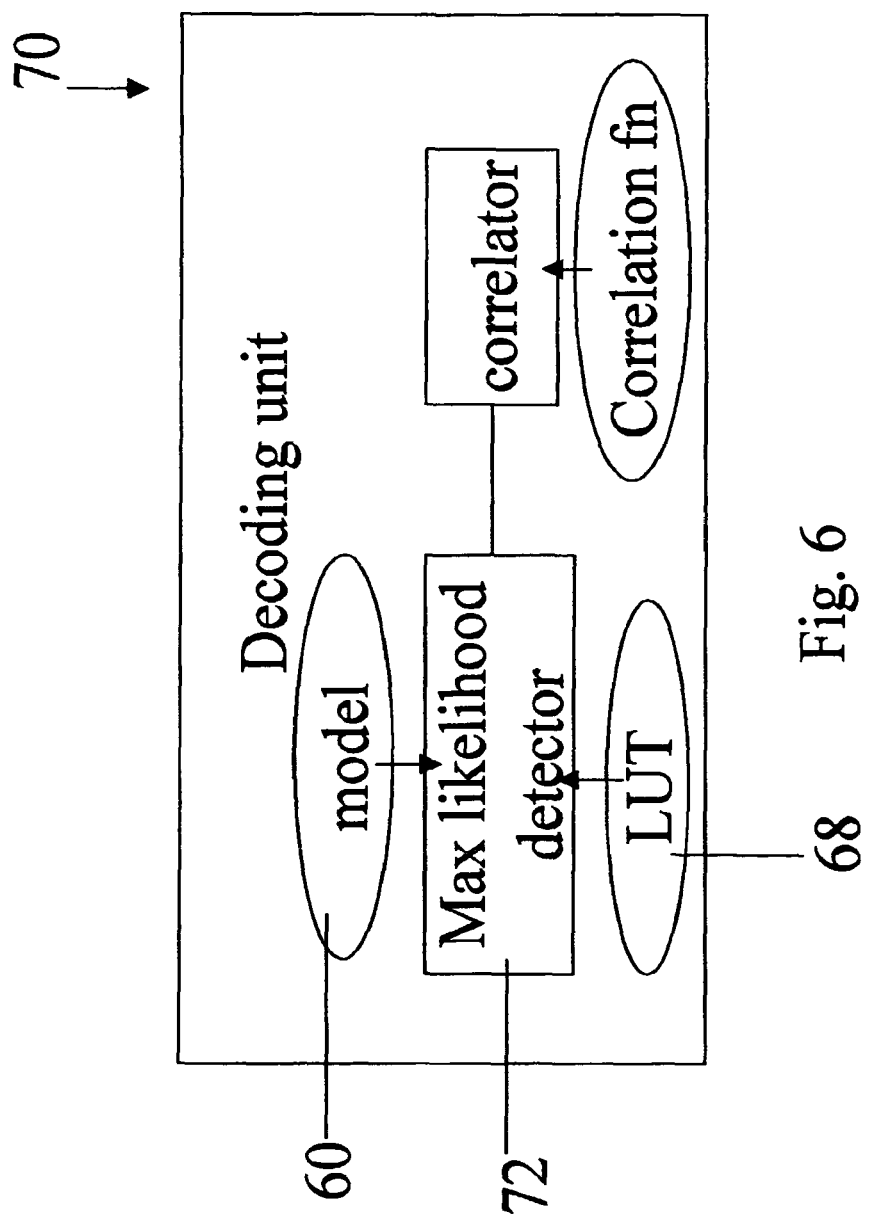
FIG. 6 is a simplified block diagram illustrating a preferred embodiment of the signal decoder for use in the system of FIG. 1.

Reference is now made to FIG. 6, which is a simplified block diagram showing a decoding unit 70 for carrying out decoding as described above. The decoding unit 70 comprises a maximum likelihood detector 72 which uses channel model 60 as described with reference to FIG. 4 above, and look-up table 68. The maximum likelihood detector 72 is followed by correlator 74, which uses correlation function 76 to carry out correlation using the distance detected as most likely by the maximum likelihood detector 72, to confirm that the detected distance is correct.

Figure 7:
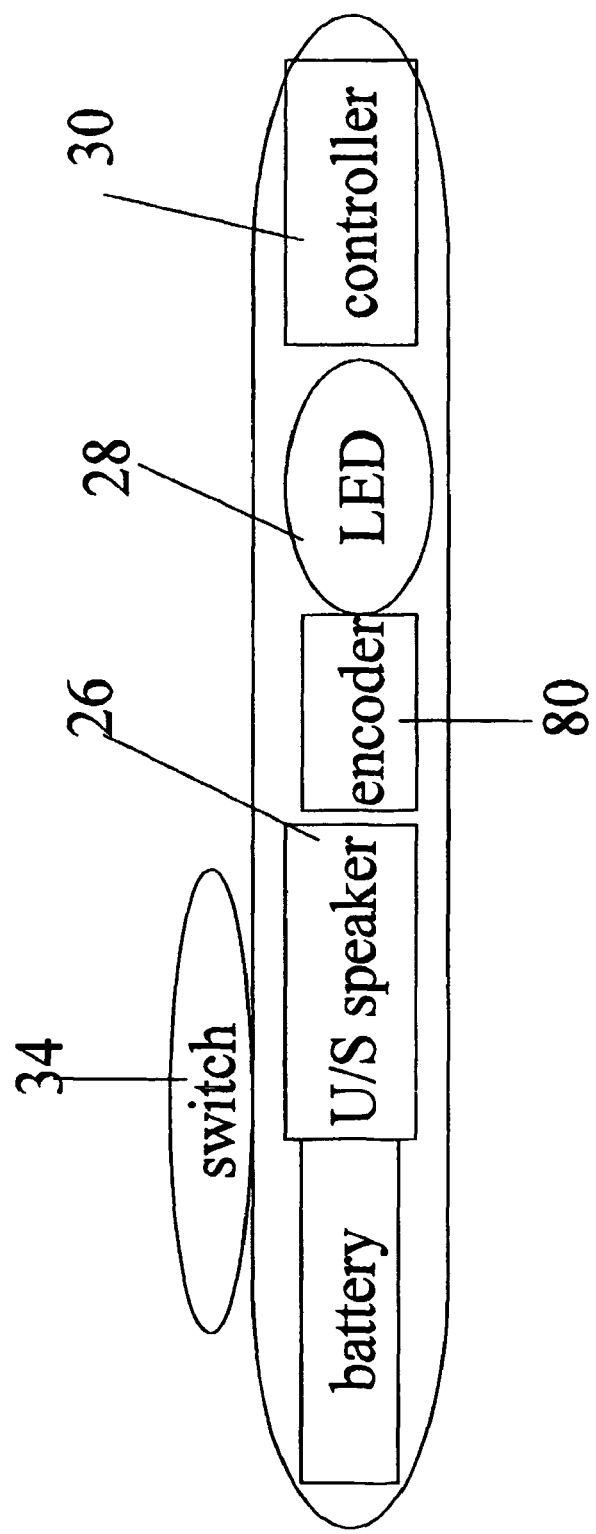
FIG. 7 is a simplified block diagram of a second preferred embodiment of the pointing device of the system of FIG. 1.

Reference is now made to FIG. 7, which is a simplified diagram showing a pointing device according to a further preferred embodiment of the present invention. Parts that are the same as in previous figures are given the same reference numerals and are not described again except to the extent necessary for an understanding of the present figure. The pointing device of FIG. 7 differs from that of FIG. 2 in that it additionally comprises an encoding unit 80, connected between the LED 28 and the speaker 26. Encoding unit 80 provides additional coding of the signal prior to output to speaker 26. Additional coding of the signal can be used for greater signal robustness and also to minimize interference with neighboring users. The latter has several benefits. It allows multiple users to use the same base station, or it may allow a single user to use several pointing devices, for example in a game such as chess. If each playing piece is a different pointing device and signal decoding allows the different pointing devices to be distinguished then the system is able to incorporate multiple playing piece games. Minimizing interference with neighboring users may further allow the co-existence of multiple users in the same room.

One of the preferred ways of minimizing interference between different pointing devices is by using pseudo-random frequency hopping algorithms. Each mobile unit preferably has a pseudo-random frequency hopping sequence incorporated within encoding unit 80, or if preferred within controller 30. The base station, or the decoding unit as preferred, has a corresponding dehopping unit which is able to synchronize on the same hopping sequence. A preferred embodiment provides synchronization by using the IR or other electromagnetic, signal to transfer the hopping sequence to the base station. Another preferred embodiment uses factory calibration to provide a sequence.

One of the applications that can be realized with a position detection system based on frequency hopping is integration of the base station 20 of the system with a WLAN base station. The result is an enhanced WLAN and positioning base station able to support multi users and able to manage each of the users data separately. The users are able for example to write on paper or on their own electronic pads using pointing devices belonging to or compatible with the WLAN. Unseen, the WLAN traces the movements of each of the users separately and produces networked electronic versions of each of their hand written documents. For the purposes of writing on paper, the pointing device 14 is a combination of the pointing device of FIG. 2 and a standard pen.

Customer and application needs vary, and individual applications may require maximization of particular variables in relation to others. For instance, in certain applications, accuracy may be of less importance than consumption of current, and thus possible accuracy levels or the number of detectors in operation may be reduced in favor of reduced current consumption. In order to allow such system-specific optimization without manufacturing a range of similar devices, a flexible programmable scheme is preferred, both for the base station and for the mobile unit.

Flexible programming may be performed by burning fuses or by use of non-volatile memory (as ROM or EEPROM). Typical data for setting in this way includes:

Sampling rate per second,
Transmission power,
2-D or 3-D application,
and the like.

The positional element 14 may additionally be supplied with a pressure sensor, whose output can be used by appropriate applications to allow graphical or security features. For example a line may be drawn differently depending on the pressure applied. A suitable pressure sensor for incorporation into a pointing device may comprise a digitizer (10 bits or less), a strain gauge and a driving circuit.

Yet another feature may include the ability to measure the angle of the mobile unit (useful for instance in digital stylus applications). A suitable angle sensor for incorporation into pointing device 14 may comprise a tilt gauge, digitizer and driving circuit. In a further embodiment, two position indicators such as ultrasonic loudspeakers may be placed at either end of the pointing device, each transmitting in a manner that renders the signals distinguishable. The angle of the pointing device may then be derived by calculating each of the positions and performing simple geometry between them.

Stand Alone Base Station

As mentioned above, in the embodiment of FIG. 1B, base station 20 includes the ability to decode signals without the support of the host computing device 10.

The decoding algorithm described hereinabove does not require especially powerful processing power and it is thus feasible to include a limited resource CPU into the base station without increasing the overall cost. In a preferred embodiment, a computation power of ~1 MIPS is used to decode the signals. Such low computation power can in fact be integrated into a single customized base station chip, or as a low cost add-on. The use of such a CPU allows a more conventional connection to hosts, such as: UART, USB, Serial and others since the signal that is transferred is the processed result of the positioning and not the raw signals. Such an output is also suitable for direct use within WLAN and BlueTooth.

Such a stand-alone base station preferably includes a digitizing element, (A/D converter), a CPU, a memory and interface circuitry.

Positioning with Light

Figure 8:
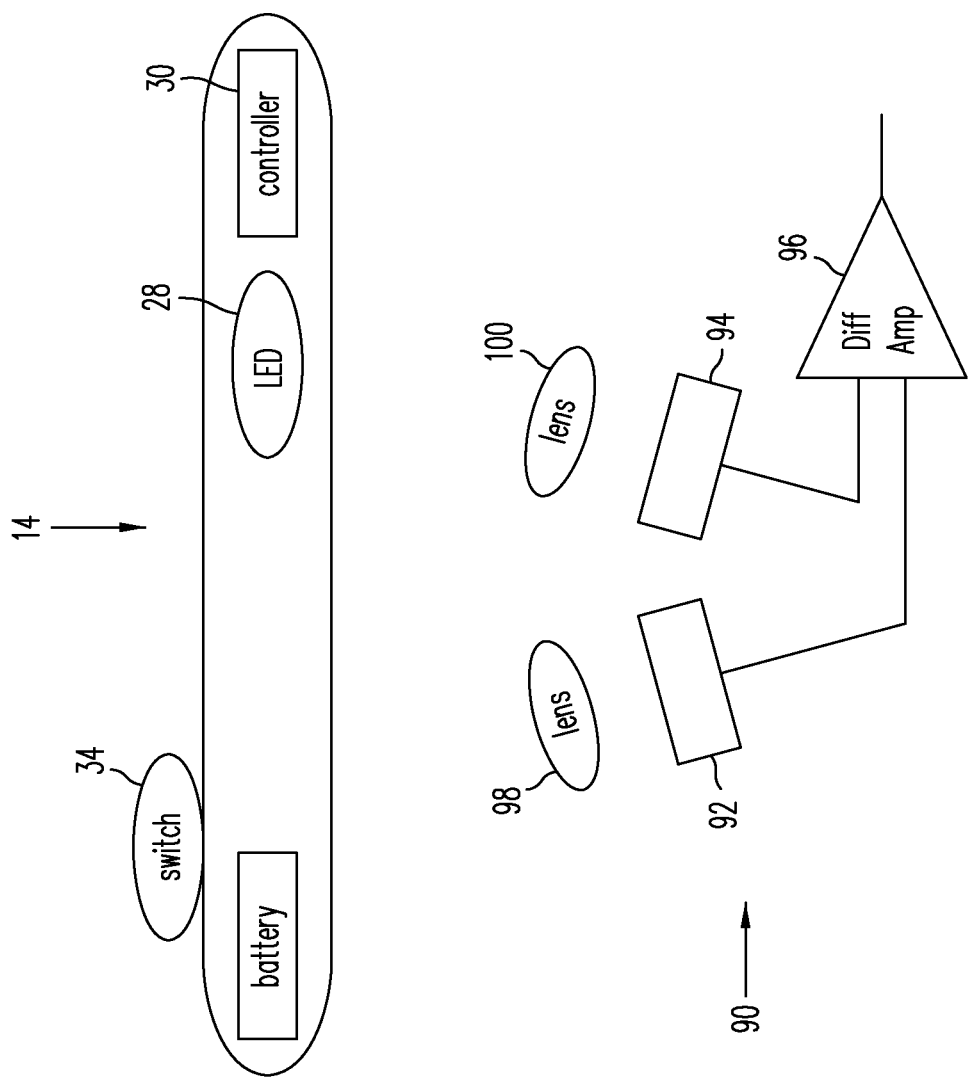
FIG. 8 is a simplified block diagram illustrating a third preferred embodiment of the pointing device of the system of FIG. 1 together with a direction sensor.

Reference is now made to FIG. 8, which is a simplified block diagram illustrating a variation of the above-described embodiments using light direction finding sensors. Parts that are the same as in previous figures are given the same reference numerals and are not described again except to the extent necessary for an understanding of the present figure. A sensor 90 comprises two LEDs 92 and 94 offset by a predetermined angle. A differential amplifier 96 is connected, via each of its two differential inputs, between the two LEDS 92 and 94 so as to measure the difference between levels of current in each of the LEDs. LED 28 in the pointing device 14 produces a narrow light beam whose direction can be measured from the sensor. The sensor 90 is preferably constructed with optics in the form of lenses 98 and 100 to cover the sensing area and ensure that light coming from a predetermined field view falls directly onto the sensing area.

The base station is essentially the same as that in FIG. 3, except that in place of microphones there are light direction finding sensors 90 and the separate IR photodiode is not needed since all of its synchronizing and like functions can be taken over by the photodiodes of the light direction finding sensors.

The corresponding decoding algorithm deals with a different kind of information part of the signal but the underlying information is dealt with substantially in the same way. Finding both a direction and distance is akin to the principles behind stereoscopic vision and angles at two sensors are found and triangulated to give a position. Otherwise the same issues apply as to the decoding algorithm of the previous embodiments, namely issues of the low sampling rates and low frequencies needed if the system is to take advantage of the analog input and the computing device hardware.

Attitude Detection with Ultrasonics

Figure 9:
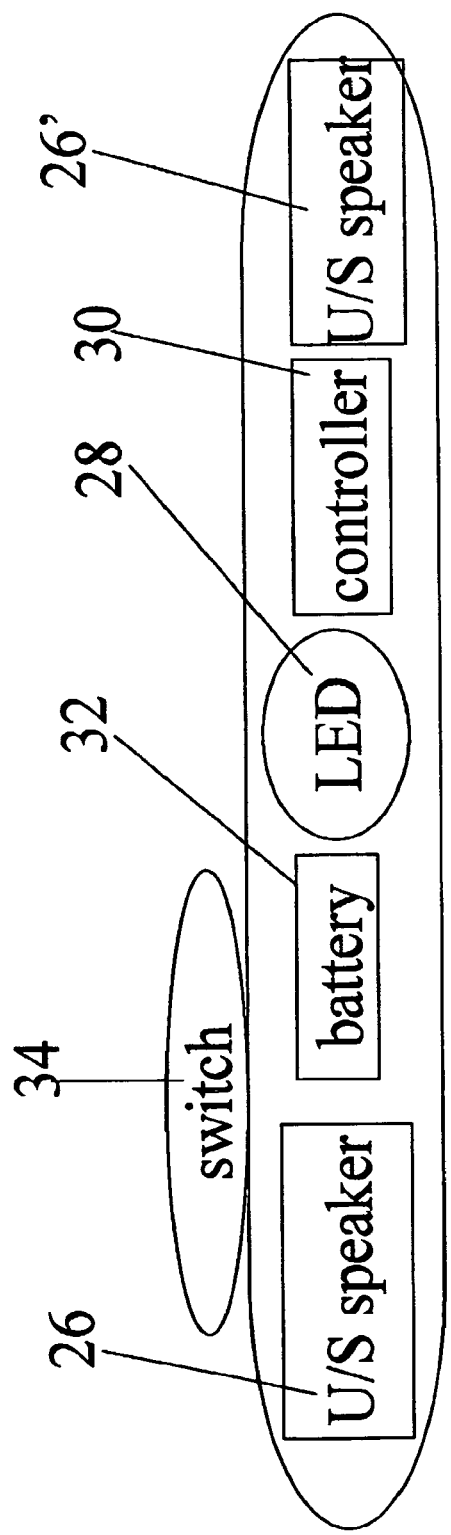
FIG. 9 is a simplified block diagram illustrating a further preferred embodiment of the positional element of FIG. 1, adapted for attitude detection.

Reference is now made to FIG. 9, which is a simplified diagram showing the positional element of FIG. 2 adapted for attitude detection. Parts that are the same as in FIG. 2 are given the same reference numerals and are not described again except to the extent necessary for an understanding of the present figure. A second speaker 26' is provided at a predetermined distance from the first speaker 26. Preferably the two speakers are provided at opposite ends of the element. Each speaker issues a separate waveform which is separately detected and the attitude of the element is determined by drawing a straight line between the two positions. The two speakers preferably are able to identify themselves to the detectors and to operate simultaneously. Their respective signals may be time or frequency multiplexed to work together and in one preferred embodiment the two speakers use frequency hopping, each using a different pseudo-random sequence.

Electromagnetic Positioning

Another method that can be used with the microphone input is electromagnetic positioning. A board with orthogonally arranged magnetic loops (conductors) serves as a writing pad. A pointing device emits electromagnetic signals, which are picked up by the pad's magnetic loops. By analyzing the signals, the pointing device's position can be calculated. The loops can be printed onto a PCB and can be made small enough to give any desired level of precision.

The pointing device is the same as that of FIG. 2, except that the LED 28 is replaced by an electromagnetic transmitter including an emitting antenna and associated modulating circuitry. The base station comprises built in loops as sensors with RF demodulating circuitry but otherwise is the same as the base station of FIG. 3.

The decoding algorithm again has to deal with a different kind of information part of the signal but otherwise covers the same issues as those discussed above.

The positioning system of the present embodiments has a wide range of applications, a few of which are listed below. Preferably a single electronic device is manufactured, and is set up in different ways for the chosen application, possibly by the use of jumper or dip switches. The switches may allow configuration of the system for the most appropriate trade-offs for the given application. In some applications low power consumption is important. In others accuracy of positioning is critical. In yet others, accuracy is less important than rapid updating and the number of samples per second. In others range is important, and in yet others the ability to accommodate large numbers of users may be critical.

In the following, a number of applications of the above-described technology are considered.

Global Tracking System

Figure 10:
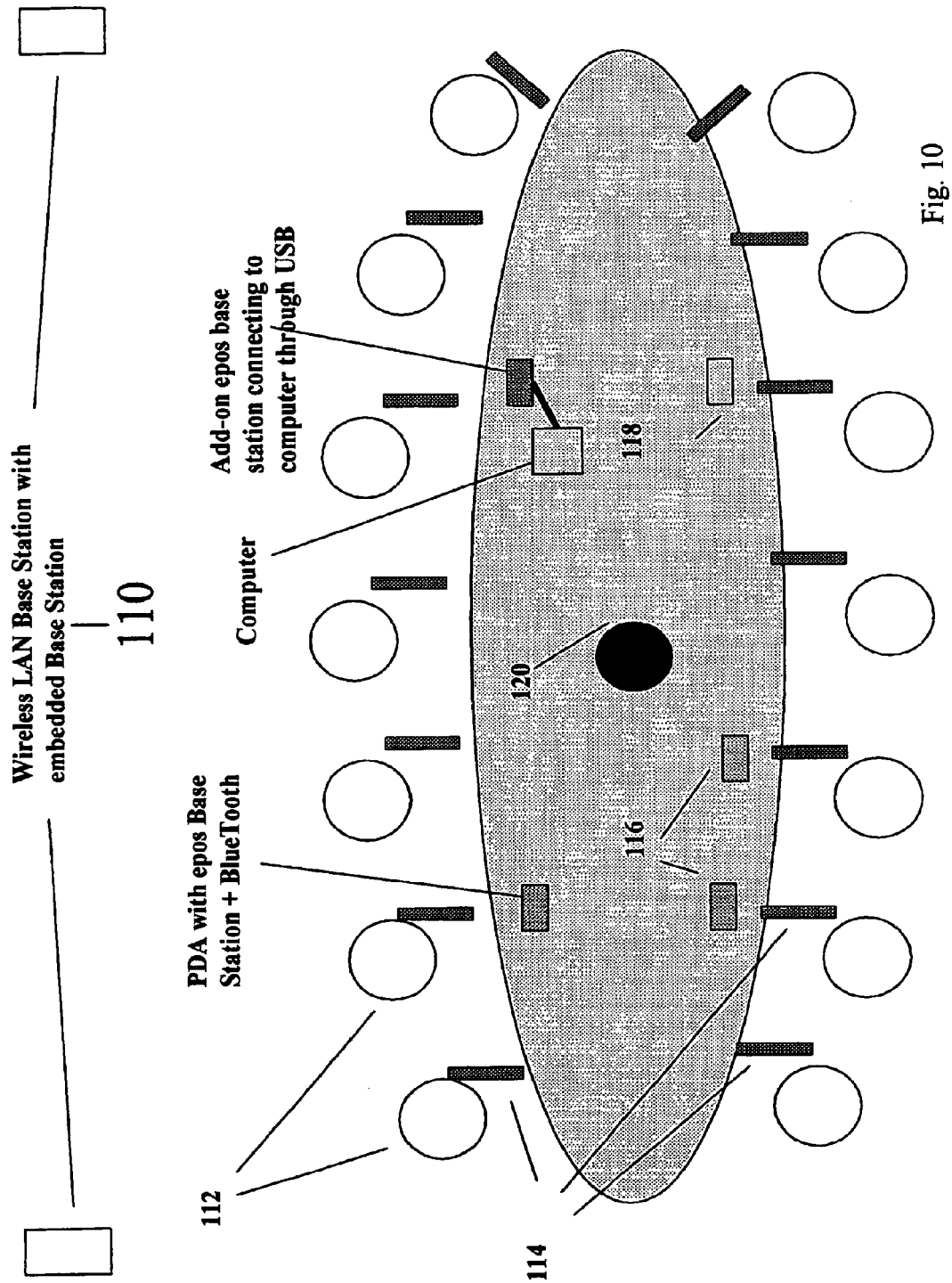
FIG. 10 is a simplified diagram illustrating an application of the present embodiments to multiple users in a conference room environment.

Reference is now made to FIG. 10, which is a simplified diagram illustrating a conference room fitted with a global tracking system. The global tracking system comprises a wireless LAN system 110 with an embedded base station according to the present embodiments. A series of users 112 in the conference room have positional elements 114 according to the preferred embodiments. Each positional element has its own unique identity as described above. The various positional elements transmit waveforms, and the waveforms are detected by the global tracking system. The waveforms may additionally be tracked by tracking systems local to the user, such as standalone base stations 116, cellular telephone 118 with built in base station, and the like. In addition the conference table itself may have its own master base station 120 combined with the conference room telephone facility.

Toy Applications

Toys with positioning can be divided into three sub-categories, to be explained below:

Front of Screen Games,

Front of computer Games, and

Computer Free Environments.

Front of Screen Games—these are games in which user interaction is directly with the computer screen, for example:

(a) Toy Finger:
 a. a toy pointing devices for toddlers and/or children to point at computer screens in order to interact with the website and/or program. Touching with the pointing device on the screen launches a cartoon website inside the member zone of the toddler. The pointing device also acts as the means to interact with objects appearing on the screen.
 b. The pointing device, perhaps in the outward form of a pointing finger or cartoon character, and technologically a digital pen, has its unique identity, according to any of the above embodiments.

(b) Toy Bird:
 a. A game is provided in which the user flies a bird to a nest located in upper right hand side of the screen in order to receive points or applause.
 b. The implementation is as for the pointing finger above.

(c) Wireless Joysticks
 a. A possible application of the technology is a wireless joystick for computer games. Joysticks have applications across the computer game industry.

Figure 11:
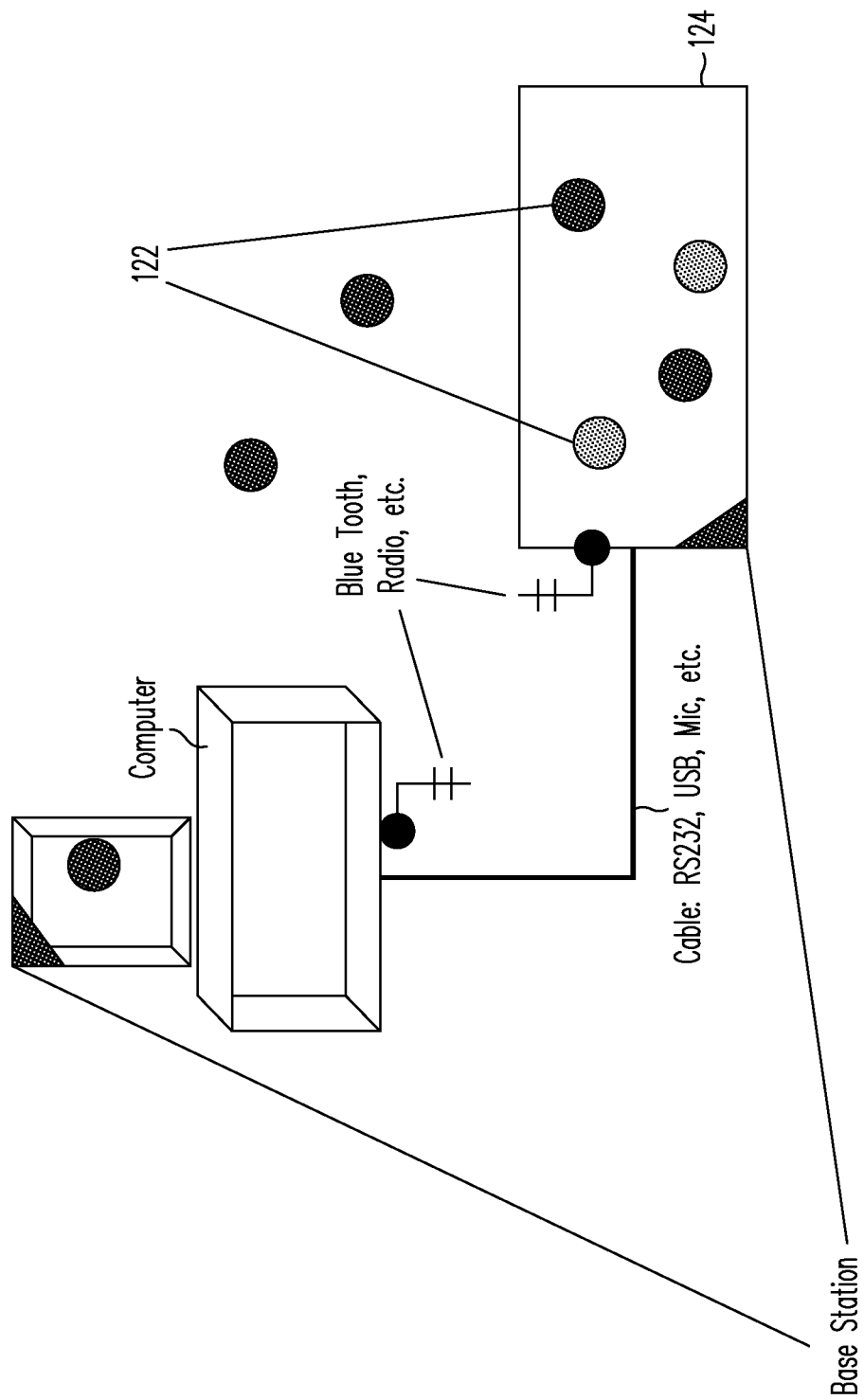
FIG. 11 is a simplified diagram illustrating an application of the present embodiments to a screen interactive board game.

Front of Computer Games—Front of computer games are games where interaction happens in the vicinity of the computer, or for that matter the PDA, cellular telephone, or an element attached to the computer. Examples are as follows:

Battlefield Game
 a. With reference now to FIG. 11, pieces 122 move over a board 124. The board may typically be a battlefield in which two opponents join battle. Playing pieces represent soldiers and weapons which advance towards each other and fight. Certain aspects of the game occur only on the screen. For example if one of the players advances his soldier to a specific location containing a mine, the resulting explosion occurs on the screen.
 b. Each of the soldiers and weapons (vehicles, etc.) has a Wireless Terminal that has its own unique identity embedded therein. A Base Station/s embedded within the computer or an element attached to the computer receives the unique positioning coordinates of each and every soldier, vehicle, etc. and coordinates it using a war plan application on the computer.

Computer Free Environments—Computer free environment games are games that do not require a PC because they themselves carry a sufficiently powerful CPU.

(a) Battlefield Games—as above but standalone, without the computer.

(b) Positioning Enabled Toy Cars
 a. A car follows or otherwise interacts with another car
 b. One car has a Base Station unit while the other has a Wireless Terminal unit. The second car is thus able to follow the first one or otherwise interact therewith.

(c) Independent Robots

Figure 12:
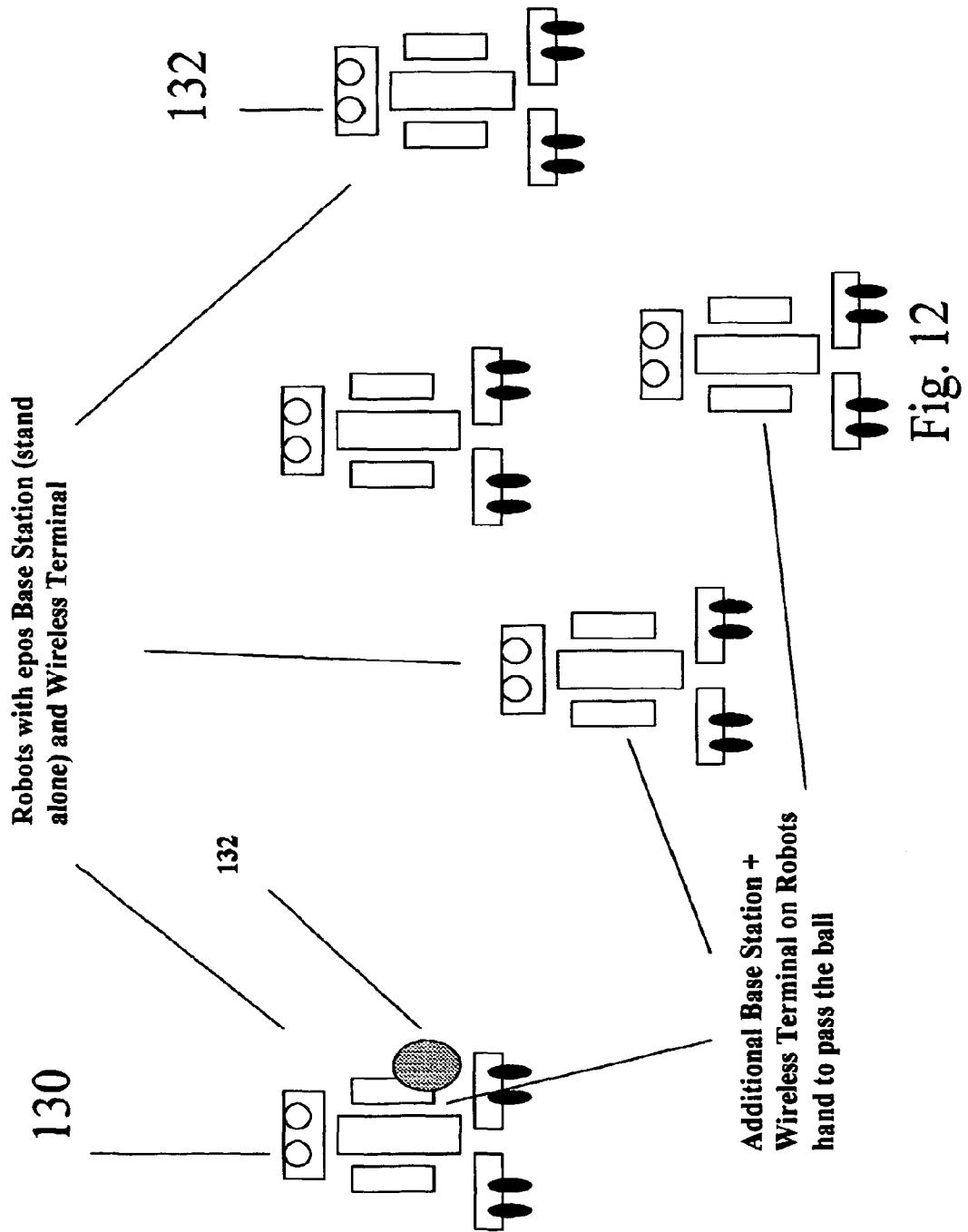
FIG. 12 is a simplified diagram illustrating an application of the present embodiments to a free-standing robot game.

Reference is now made to FIG. 12, which illustrates a game in which a series of independent robots 130 keep track of each other's position and the position of a ball 132 and transfer the ball between them. Each robot has a positional element for the robot as a whole and additional positional elements for each limb whose position is needed for the kind of maneuvers intended. In one embodiment each robot includes its own standalone base station and makes its decisions based on incoming positional data from itself and from the surrounding robots. However in a second simplified embodiment each robot only has positional elements and control circuitry. Tracking is carried out by an external base station which then instructs the robots on how to move. Thus only a single intelligent device need be provided and the robots can be relatively unsophisticated.

In the embodiment, one robot transfers a ball to a second robot. The second robot takes the ball and transfers it to a third robot.

In an alternative embodiment a joystick can control the movement of a robot while the others automatically try to catch him based on his positioning. The application can make use of two-way communication, as explained elsewhere herein.

(d) Positioning Enabled Building Blocks
 a. Building blocks are each supplied with their own unique identity. One can build various constructions interactively, receiving computer guidance during the course of building.
 b. The building blocks are each supplied with a Wireless Terminal and a unique identity.

(e) Command & Control Gloves

Command and control gloves for virtual reality or like games. Each limb of the glove is provided with position location ability according to the above embodiments. In accordance with the present embodiments such positioning ability can be provided simply by attaching a sensor to the end of each finger of a regular glove. Thus each finger is provided with separate positioning ability to be read as desired by the game application. Alternatively or additionally, rings on the fingers may provide wireless terminals or straps may be applied on any part of the body of the user or on items or accessories used in the game.

Inventory Application

Figure 13:
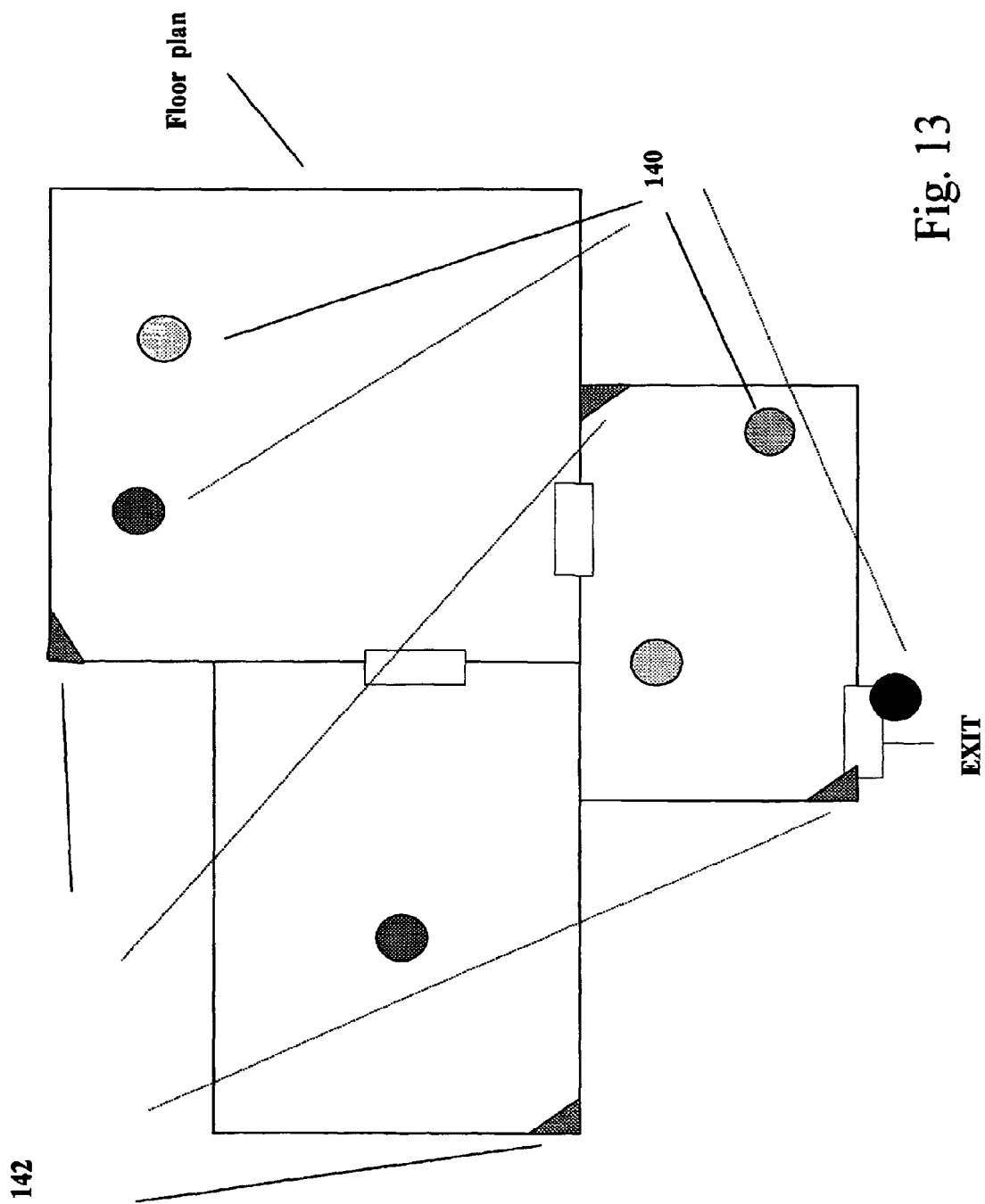
FIG. 13 is a simplified diagram illustrating an application of the present embodiments to an inventory tracking system.

Reference is now made to FIG. 13, which is a simplified diagram illustrating an inventory system according to an embodiment of the present invention. Positional elements are embedded in items of stock 140 it is desired to inventory and a base station 142 is provided in the premises to track movement. Such a system is advantageous in tracking stock that moves frequently and for which updated information is needed.

Manufacturing Application

Figure 14:
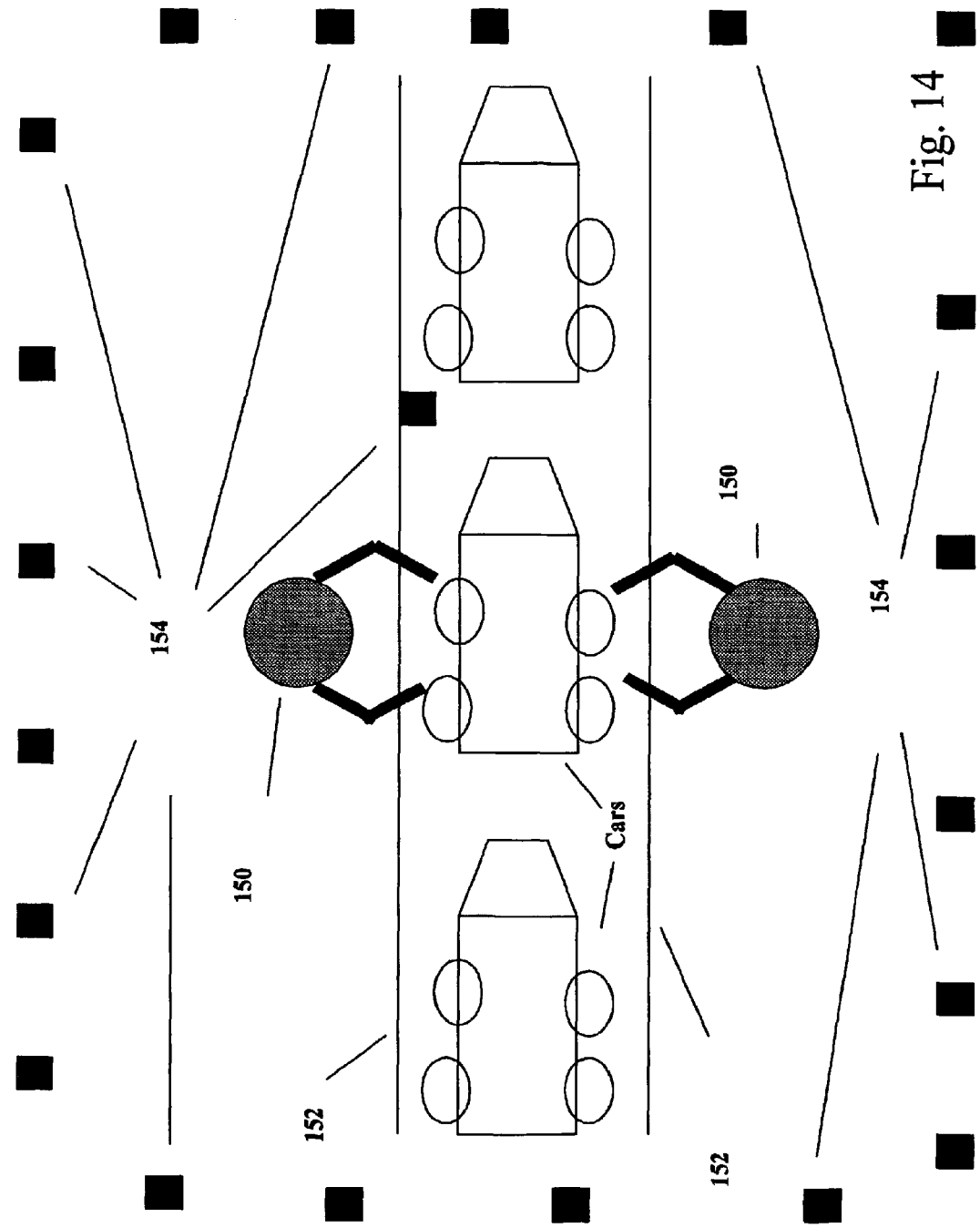
FIG. 14 is a simplified diagram illustrating an application of the present embodiments to a robot-based manufacturing system.

Reference is now made to FIG. 14 which shows a number of robots 150 arranged about a production line 152. Each robot has a production task and limbs and mobility to carry out the task. Base stations 154 keeps global control of the robots. Each robot may have a positional element for the robot as a whole and/or positional elements for each limb whose position is needed for the kind of maneuvers intended. In one embodiment, where robots need to interact with each other, each robot includes its own standalone base station and makes its decisions based on incoming positional data from itself and from the surrounding robots. However in a second simplified embodiment each robot only has positional elements and control circuitry. Tracking is carried out by the external base stations 154 which then instruct the robots on how to move. Thus only minimal number of intelligent devices need be provided, and relatively unsophisticated robots can provide group behavior.

Higher precision can be achieved by putting additional wireless terminals in the detection space, at pre-determined locations. Measuring these units will calibrate the absolute measurement of the moving terminals so that a greater precision can be achieved.

Security Application

A pointing device with a base station according to the present embodiments can be incorporated into an electronic identification scheme. Personal written signatures are often used for identification but a skilled forger is able to copy other persons' signatures. A forger however, copies the outward appearance of the signature and not the way in which the user applies pressure to the pen or holds the pen, say at a given angle on a given part of the signature. A pointing device, that the user can use as a pen to write on paper, and which can supply not only movement information but also pressure and attitude information, provides an enhanced security personal signature. Systems for obtaining signature information which incorporate pressure as well as the outward appearance are in use, however, use of the present embodiments makes such a system cheaper and more flexible. In addition, attitude information of the pen allows for greater verification. The angle of the pen can be measured by adding an additional angle sensor to the pen. The angle sensor may comprise an accelerometer or may use an additional location signal transmitter on the other side of the stylus, as described above. In the latter case, the base station determines the XYZ locations of the two transducers, from which the angle of the stylus can be calculated. The angle is then used as additional factor and results in an electronic version of the signature which is a triplet of three vector values (XY location, pressure, angle).

The following embodiments describe an enhanced identification apparatus, which integrates positioning with other security methods.

Usage of a pointing device in the form of a stylus as an authentication means. A group of styluses are provided as part of the system. One of these styluses is provided to each of an identified group of users and each stylus is provided with its own electronic identity.

By identifying the stylus, the user presently interacting with the system is identified and this allows verifiable usage of the system in security-wise applications. The user may also be required to provide his usual signature, which may be electronically verified based on movement and applied pressure or the like.

For greater security, a stylus can also be provided with a feature to enable a digital signature, for example based on the Public Key Infrastructure (PKI). The user may sign with his usual hand-written signature. Once the hand signature is verified, the system uses the stylus to provide a digital signature to the document using a PKI algorithm. Such a feature requires 2-way communication between the pointing device and the base station, which can be provided using available IR or RF channels. The electronic signature thus provides a guarantee both that the personalized stylus was used and that the authorized user was verified.

As an alternative or in addition to the above, a keypad may be added to allow the user to enter a personal identification number (PIN).

As a further alternative or in addition to the above, the system may further incorporate a biometric sensor to the stylus or the base station to increase the security level. The biometric sensor may be for fingerprint recognition, retinal signature recognition, voice signature recognition and the like.

Additional Stylus Applications

A stylus or digital pen may additionally be used for:

Remote control. The position of the stylus may be tracked and used to exert control over a system. Thus pointing to a device may appear to make it operate. Twisting the stylus whilst pointing may affect the operation of the device.

Wristwatch phones may be supplied with a miniature stylus to write on the face of the phone or on an adjacent small pad attached thereto. Alternatively writing may be carried out on regular paper and the watch located nearby to track the stylus movement.

The stylus may be used to provide SMS messages instead of having to type them in through the keyboard and/or may provide the ability to sketch and send the sketch as a file. Likewise the stylus may be used to input a telephone number which is then dialed. The same idea may be applied to conventional telephones.

The stylus may be used to enable writing for data input etc to other devices such as cash registers, gaming devices, Cable TV, refrigerators, etc.

The stylus of the security application discussed above can be used as part of a cheque or credit card signature authentication in front of a point of sale device.

Speaker pen—Provide the computing power is available, upon writing, it is possible to provide an application in which the pen writes and the application speaks the written notes. Applications for recognizing handwriting are well-known, and applications for electronic voicing of writing are known. The combination of the two with the stylus of the present embodiments provides a way of reading back handwritten notes. The application may be located in the base station or attached computer. If using the embodiment in which transmission back to the pen is possible, then the pen itself can speak the written notes.

Combined digital pen and translator—the pen writes and translates the output into other languages.

Any combinations of the above.

A standalone device serving as the Base Station, has its own screen and preferably is networked, via bluetooth, Wireless LAN, regular LAN or the like to printers and other devices. The arrangement provides a full range of coverage from hand input to final printed or any other form of output.

Miscellaneous Applications

3D Stereo—by placing the wireless transmitter on a person the stereo can choose how to direct different volume/sound from different speakers to give the person wherever he is in the room a complete and real surround experience. Stereo direction as such is known but can be greatly simplified by using tracking according to the present invention.

Video Tracking—Based on the same principle as stereo tracking, tracking may be used in association with a PC video cam to automatically follow a person who is being filmed. The embodiments are of course extendable to any video system and can be especially useful for video conferencing, etc.

Exterior+interior positioning system for cars—for example, having elements inside the car controlled or known about by keeping track of their position.

Tracking device—a standalone base station device with a screen directing the user to the location of an object in its vicinity. The system may indicate the identity and location of these objects on the screen. The system may be useful in a room for finding keys and other personal items.

Two-way network system. The system comprises a series of device having both a transmitter and receiver. Each device locates and registers each other device it is aware of and between them they build a virtual network. The network may be built amongst themselves or may additionally use a smart hub. The result is a radio based network whose range is far greater than the range of any of the individual objects. Each object has the exact co-ordinates of neighboring objects and thus can use directional transmission to improve range or spectral efficiency and the network can be used to deliver data to any point or to obtain from any participant object the whereabouts of unrelated network objects and so forth. The network can be connected to other like networks or can have a point of access to a wider network. The individual elements may be provided with their own identities and the system is useful for providing real time tracking of teams of men and simultaneously providing them with an intercom system.

A scaled down version of the inventory system may provide an Out of Range alert. A positional element may be provided on lose items temporarily provided to customers, for example earphone headsets provided to airline passengers. If the customer takes away the item then an out of range alarm is set, allowing for the errant device to be found.

A user may have a personal locator which activates doors, lights and appliances. Likewise communications equipment can be directed, by tracking of the personal locator, to divert calls faxes, etc. to a user. Both tracking and management of the communication transfer are preferably managed over a LAN, or WLAN. The personal locator can itself tell the user about incoming calls and other communications and give the options for receiving the communication. In the WLAN version, the base station is preferably part of the WLAN infrastructure.

It is expected that during the life of this patent many relevant pointing devices, position detection systems, biometric sensors and the like will be developed and the scope of the corresponding terms as used herein is intended to include all such new technologies a priori.

It is appreciated that certain features of the invention, which are, for clarity, described in the context of separate embodiments, may also be provided in combination in a single embodiment. Conversely, various features of the invention, which, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for receiving signals to determine a position of an object, comprising:
   a detector arrangement configured to detect at least one continuous carrier ultrasonic waveform having data modulated thereon and a synchronization signal emitted by the object, the detector arrangement comprising:
      at least a first acoustic sensor and a second acoustic sensor each configured to receive a version of the at least one continuous carrier ultrasonic waveform; and
      a synchronization signal sensor configured to receive the synchronization signal; and
   a computing device configured to:
      decode the received versions of the continuous carrier ultrasonic waveform and the synchronization signal to measure a time delay between each of the versions of the received continuous carrier ultrasonic waveform and the received synchronization signal;
      convert the measured time delays to at least a first distance and a second distance; and
      triangulate the first distance and the second distance to determine the position.

2. The system of claim 1, wherein the first acoustic sensor and the second acoustic sensor are each configured to receive a version of a second continuous carrier ultrasonic waveform emitted by the object.

3. The system of claim 2, wherein:
   the computing device is further configured to:
   measure time delays between each of the versions of the received second continuous carrier ultrasonic waveform and the received synchronization signal;
   convert the time delays measured from the received second continuous carrier waveform to at least a third distance and a fourth distance; and
   triangulate the third distance and the fourth distance to determine a second position.

4. The system of claim 3, wherein the position corresponds to a position of the object in a first dimension and the second position corresponds to a position of the object in a second dimension.

5. The system of claim 3, wherein the computing device is further configured to determine an angle of the object from the position and the second position.

6. The system of claim 2, wherein the detector arrangement is configured to supply a first version of the first continuous carrier ultrasonic waveform and a second version of the second continuous carrier ultrasonic waveform as separate channels for decoding by the computing device.

7. The system of claim 6, wherein the separate channels are time multiplexed or frequency multiplexed into a single channel provided to a single analog input of the computing device.

8. The system of claim 1, wherein the synchronization signal comprises an electromagnetic signal and the synchronization signal sensor comprises an electromagnetic sensor.

9. The system of claim 1, wherein the at least one continuous carrier ultrasonic waveform is sampleable at a low sampling rate.

10. The system of claim 9, wherein the low sampling rate is at or below a Nyquist sampling rate of sound signals.

11. The system of claim 9, wherein the low sampling rate is substantially 6KHz.

12. The system of claim 1, wherein the computing device is integrated with the detector arrangement.

13. The system of claim 1, wherein the detector arrangement is coupled with a cellular telephony device.

14. The system of claim 1, wherein the computing device is configured to triangulate the first distance, the second distance, and a known distance between the first acoustic sensor and the second acoustic sensor to determine the position.

15. A method for determining a position of an object, comprising:
receiving, by a detector arrangement, at least one continuous carrier ultrasonic waveform having data modulated thereon and an electromagnetic signal emitted by the object, wherein receiving the at least one continuous carrier ultrasonic waveform comprises receiving at least a first version of the at least one continuous carrier ultrasonic waveform at a first acoustic sensor of the detector arrangement and a second version of the at least one continuous carrier ultrasonic waveform at a second acoustic sensor of the detector arrangement;
decoding, by a processing unit, the received versions of the continuous carrier ultrasonic waveform and the received electromagnetic signal;
measuring, by the processing unit, a time delay between each of the decoded versions of the continuous carrier ultrasonic waveform and the decoded electromagnetic signal;
converting, by the processing unit, the measured time delays to at least a first distance and a second distance; and
determining, by the processing unit, the position of the object based on triangulating the first distance and the second distance.

16. The method of claim 15, wherein:
receiving the at least one continuous carrier ultrasonic waveform further comprises receiving a first version of a second continuous carrier ultrasonic waveform at the first acoustic sensor and a second version of the second continuous carrier ultrasonic waveform at the second acoustic sensor;
decoding the received versions of the continuous carrier ultrasonic waveform further comprises decoding the received versions of the second continuous carrier ultrasonic waveform;
measuring the time delays between each of the decoded versions of the continuous carrier ultrasonic waveform and the decoded electromagnetic signal further comprises measuring time delays between each of the versions of the second continuous carrier ultrasonic waveform and the decoded electromagnetic signal;
converting the measured time delays further comprises converting the measured time delays from the received versions of the second continuous carrier waveform to at least a third distance and a fourth distance; and
determining the position of the object further comprises determining a second position of the object from triangulating the third distance and the fourth distance.

17. The method of claim 16, wherein the position corresponds to a position of the object in a first dimension and the second position corresponds to a position of the object in a second dimension.

18. The method of claim 16, further comprising determining an angle of the object from the position and the second position.

19. The method of claim 15, further comprising sampling the at least one continuous carrier ultrasonic waveform at a low sampling rate.

20. The method of claim 15, further comprising synchronizing the processing unit with the object using the decoded electromagnetic signal.

21. The method of claim 20, wherein synchronizing comprises compensating for a clock drift of the processing unit and a clock associated with the object.

22. A system for determining a position of an object, comprising:
means for receiving at least one continuous carrier ultrasonic waveform having data modulated thereon and an electromagnetic signal emitted by the object, wherein receiving the at least one continuous carrier ultrasonic waveform comprises receiving at least a first version of the at least one continuous carrier ultrasonic waveform at a first sensing means of the means for receiving and a second version of the at least one continuous carrier ultrasonic waveform at a second sensing means of the means for receiving;
means for decoding the received versions of the continuous carrier ultrasonic waveform and the received electromagnetic signal;
means for measuring a time delay between each of the decoded versions of the continuous carrier ultrasonic waveform and the decoded electromagnetic signal;
means for converting the measured time delays to at least a first distance and a second distance; and
means for determining the position of the object based on triangulating the first distance and the second distance.

23. The system of claim 22, wherein:
the means for receiving the at least one continuous carrier ultrasonic waveform is configured to receive a first version of a second continuous carrier ultrasonic waveform at the first sensing means and a second version of the second continuous carrier ultrasonic waveform at the second sensing means;
the means for decoding the received versions of the continuous carrier ultrasonic waveform is configured to decode the received versions of the second continuous carrier ultrasonic waveform;
the means for measuring the time delay between each of the decoded continuous carrier ultrasonic waveform and the decoded electromagnetic signal is configured to measure time delays between each of the versions of the second continuous carrier ultrasonic waveform and the decoded electromagnetic signal;
the means for converting the measured time delays is configured to convert time delays from the received second continuous carrier waveform to at least a third distance and a fourth distance; and
the means for determining the position of the object is configured to determine a second position of the object from triangulating the third distance and the fourth distance.

24. The system of claim 23, wherein the position corresponds to a position of the object in a first dimension and the second position corresponds to a position of the object in a second dimension.

25. The system of claim 23, further comprising means for determining an angle of the object from the position and the second position.

26. The system of claim 22, further comprising means for sampling the at least one continuous carrier ultrasonic waveform at a low sampling rate.

27. The system of claim 22, further comprising means for synchronizing the processing unit with the object using the decoded electromagnetic signal.

28. The system of claim 27, wherein the means for synchronizing is configured to compensate for a clock drift of the processing unit and a clock associated with the object.

29. A non-transitory computer-readable medium including instructions that, when executed by a processing unit of a system, causes the system to perform a method for determining a position of an object, comprising:

receiving at least one continuous carrier ultrasonic waveform having data modulated thereon and an electromagnetic signal emitted by the object, wherein receiving the at least one continuous carrier ultrasonic waveform comprises receiving at least a first version of the at least one continuous carrier ultrasonic waveform at a first acoustic sensor and a second version of the at least one continuous carrier ultrasonic waveform at a second acoustic sensor;

decoding the received versions of the continuous carrier ultrasonic waveform and the received electromagnetic signal;

measuring a time delay between each of the decoded versions of the continuous carrier ultrasonic waveform and the decoded electromagnetic signal;

converting the measured time delays to at least a first distance and a second distance; and determining the position of the object based on triangulating the first distance and the second distance.

* * * * *